(12) United States Patent
Shapiro

(10) Patent No.: US 8,935,658 B2
(45) Date of Patent: *Jan. 13, 2015

(54) DIGITAL ASSET DELIVERY SYSTEM AND METHOD

(71) Applicant: Alan Joshua Shapiro, Chappaqua, NY (US)

(72) Inventor: Alan Joshua Shapiro, Chappaqua, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/186,864

(22) Filed: Feb. 21, 2014

(65) Prior Publication Data

US 2014/0237444 A1 Aug. 21, 2014

Related U.S. Application Data

(60) Division of application No. 13/565,540, filed on Aug. 2, 2012, now Pat. No. 8,661,406, which is a division of application No. 12/144,598, filed on Jun. 23, 2008, now Pat. No. 8,245,185, which is a continuation of application No. PCT/IB2006/054788, filed on Dec. 12, 2006.

(60) Provisional application No. 60/753,635, filed on Dec. 22, 2005.

(51) Int. Cl.
*G06F 9/44* (2006.01)
*G06F 9/445* (2006.01)

(52) U.S. Cl.
CPC .. *G06F 8/60* (2013.01); *G06F 8/30* (2013.01); *G06F 8/61* (2013.01)
USPC ............ 717/106; 717/110; 717/139; 717/172

(58) Field of Classification Search
None
See application file for complete search history.

(56) References Cited

U.S. PATENT DOCUMENTS

| | | |
|---|---|---|
| 4,481,606 A | 11/1984 | Nozawa et al. |
| 5,196,970 A | 3/1993 | Seko et al. |
| 5,515,524 A | 5/1996 | Lynch et al. |
| 5,708,798 A | 1/1998 | Lynch et al. |
| 5,768,566 A | 6/1998 | Harikrishnan et al. |
| 5,794,052 A | 8/1998 | Harding |
| 5,825,651 A | 10/1998 | Gupta et al. |
| 5,835,777 A | 11/1998 | Staelin |
| 5,842,024 A | 11/1998 | Choye et al. |

(Continued)

OTHER PUBLICATIONS

Microsoft Corporation, "entry for 'install' (in Microsoft Computer Dictionary, Fifth Edition)", "Microsoft Computer Dictionary, Fifth Edition ", May 1, 2002.

(Continued)

*Primary Examiner* — Chameli Das
(74) *Attorney, Agent, or Firm* — Charles A. Lemaire; Jonathan M. Rixen; Lemaire Patent Law Firm, P.L.L.C.

(57) ABSTRACT

A computer system and method for software delivery that include articles of manufacture having two or more installed, functional software applications organized in a protoset, the protoset configured to enable creation of one or more subsets (also called reduced metasets) from the two or more installed, functional software applications, each of the one or more subsets configured to be operable with a predefined computer system independent of the protoset; and a protoset module configured to operate on the protoset to enable creation of the one or more subsets of the two or more installed, functional software applications, the module responsive to one or more requests for the creation of the one or more reduced metasets.

20 Claims, 10 Drawing Sheets

(56) References Cited

U.S. PATENT DOCUMENTS

| | | |
|---|---|---|
| 5,991,543 A | 11/1999 | Amberg et al. |
| 5,995,757 A | 11/1999 | Amberg et al. |
| 6,006,035 A | 12/1999 | Nabahi |
| 6,026,439 A | 2/2000 | Chowdhury et al. |
| 6,080,207 A | 6/2000 | Kroening et al. |
| 6,117,187 A | 9/2000 | Staelin |
| 6,131,192 A | 10/2000 | Henry |
| 6,182,275 B1 | 1/2001 | Beelitz et al. |
| 6,209,094 B1 | 3/2001 | Levine et al. |
| 6,243,766 B1 | 6/2001 | Sliger et al. |
| 6,247,024 B1 | 6/2001 | Kincaid |
| 6,247,126 B1 | 6/2001 | Beelitz et al. |
| 6,247,128 B1 | 6/2001 | Fisher et al. |
| 6,269,343 B1 | 7/2001 | Pallakoff |
| 6,327,706 B1 | 12/2001 | Amberg et al. |
| 6,347,371 B1 | 2/2002 | Beelitz et al. |
| 6,367,075 B1 | 4/2002 | Kruger et al. |
| 6,385,766 B1 | 5/2002 | Doran, Jr. et al. |
| 6,405,362 B1 | 6/2002 | Shih et al. |
| 6,418,554 B1 | 7/2002 | Delo et al. |
| 6,442,754 B1 | 8/2002 | Curtis |
| 6,454,572 B1 | 9/2002 | Konetski et al. |
| 6,477,703 B1 | 11/2002 | Smith et al. |
| 6,490,723 B1 | 12/2002 | Bearden et al. |
| 6,496,875 B2 | 12/2002 | Cheng et al. |
| 6,501,491 B1 | 12/2002 | Brown et al. |
| 6,512,526 B1 | 1/2003 | McGlothlin et al. |
| 6,523,166 B1 | 2/2003 | Mishra et al. |
| 6,543,047 B1 | 4/2003 | Vrhel, Jr. et al. |
| 6,550,061 B1 | 4/2003 | Bearden et al. |
| 6,550,062 B2 | 4/2003 | Barajas et al. |
| 6,564,369 B1 | 5/2003 | Hove et al. |
| 6,598,223 B1 | 7/2003 | Vrhel, Jr. et al. |
| 6,604,238 B1 | 8/2003 | Iim et al. |
| 6,615,405 B1 | 9/2003 | Goldman et al. |
| 6,615,406 B1 | 9/2003 | Amberg et al. |
| 6,668,289 B2 | 12/2003 | Cheng et al. |
| 6,681,266 B2 | 1/2004 | Ayyagari |
| 6,681,391 B1 | 1/2004 | Marino et al. |
| 6,687,902 B1 | 2/2004 | Curtis et al. |
| 6,691,253 B1 | 2/2004 | Gillenwater et al. |
| 6,711,798 B2 | 3/2004 | Brown et al. |
| 6,718,373 B1 | 4/2004 | Bearden et al. |
| 6,721,946 B1 | 4/2004 | Fogarty et al. |
| 6,745,239 B1 | 6/2004 | Hubbard |
| 6,751,795 B1 | 6/2004 | Nakamura |
| 6,757,783 B2 | 6/2004 | Koh |
| 6,760,708 B1 | 7/2004 | Hubbard et al. |
| 6,765,595 B2 | 7/2004 | Lee et al. |
| 6,772,192 B1 | 8/2004 | Fulton et al. |
| 6,807,665 B2 | 10/2004 | Evans et al. |
| 6,823,376 B1 | 11/2004 | George et al. |
| 6,868,496 B2 | 3/2005 | Sales et al. |
| 6,874,092 B1 | 3/2005 | Motoyama et al. |
| 6,874,143 B1 | 3/2005 | Murray et al. |
| 6,889,232 B2 | 5/2005 | Pudipeddi et al. |
| 6,904,592 B1 | 6/2005 | Johnson |
| 6,907,546 B1 * | 6/2005 | Haswell et al. ............ 714/38.11 |
| 6,907,604 B1 | 6/2005 | Macnair, Jr. et al. |
| 6,938,250 B2 | 8/2005 | Cohen et al. |
| 6,944,867 B2 | 9/2005 | Cheston et al. |
| 6,947,954 B2 | 9/2005 | Cohen et al. |
| 6,948,166 B2 | 9/2005 | Barfield et al. |
| 6,961,773 B2 | 11/2005 | Hartman et al. |
| 6,988,267 B2 | 1/2006 | Harris et al. |
| 6,990,636 B2 | 1/2006 | Beauchamp et al. |
| 6,993,642 B2 | 1/2006 | Burkhardt et al. |
| 7,017,144 B2 | 3/2006 | Cohen et al. |
| 7,039,594 B1 | 5/2006 | Gersting |
| 7,062,645 B2 | 6/2006 | Kroening |
| 7,092,949 B2 | 8/2006 | Ohgake |
| 7,143,067 B1 | 11/2006 | Cheston et al. |
| 7,143,408 B2 | 11/2006 | Anderson et al. |
| 7,185,335 B2 | 2/2007 | Hind et al. |
| 7,228,326 B2 | 6/2007 | Srinivasan et al. |
| 7,228,542 B2 | 6/2007 | Bryant et al. |
| 7,260,845 B2 | 8/2007 | Kedma et al. |
| 7,266,804 B2 | 9/2007 | Hogg et al. |
| 7,295,994 B2 | 11/2007 | Yoshida et al. |
| 7,320,128 B2 | 1/2008 | Hirai |
| 7,330,967 B1 | 2/2008 | Pujare et al. |
| 7,330,997 B1 | 2/2008 | Odom |
| 7,370,318 B1 | 5/2008 | Howe et al. |
| 7,376,946 B2 | 5/2008 | Nakada et al. |
| 7,398,524 B2 | 7/2008 | Shapiro |
| 7,409,675 B2 | 8/2008 | Brumme et al. |
| 7,415,707 B2 | 8/2008 | Taguchi et al. |
| 7,464,176 B2 | 12/2008 | Cohen et al. |
| 7,565,695 B2 | 7/2009 | Burtscher |
| 7,567,541 B2 | 7/2009 | Karimi et al. |
| 7,577,934 B2 | 8/2009 | Anonsen et al. |
| 7,665,084 B2 | 2/2010 | Suzuki et al. |
| 7,703,090 B2 | 4/2010 | Napier et al. |
| 7,921,082 B2 | 4/2011 | Mukker |
| 7,953,669 B2 | 5/2011 | Ohbitsu |
| 8,074,214 B2 | 12/2011 | Isaacson et al. |
| 8,108,429 B2 | 1/2012 | Sim-Tang et al. |
| 8,201,211 B2 | 6/2012 | Proust et al. |
| 8,224,784 B2 | 7/2012 | Henrickson |
| 8,555,199 B2 | 10/2013 | Kurtz et al. |
| 2002/0069324 A1 | 6/2002 | Gerasimov |
| 2002/0083430 A1 | 6/2002 | Kusuda et al. |
| 2002/0087965 A1 | 7/2002 | Lin |
| 2002/0092014 A1 | 7/2002 | Shibusawa et al. |
| 2002/0129043 A1 * | 9/2002 | Nakada et al. ................ 707/200 |
| 2002/0129351 A1 | 9/2002 | Bedos et al. |
| 2002/0147972 A1 | 10/2002 | Olmeda et al. |
| 2002/0188941 A1 | 12/2002 | Cicciarelli et al. |
| 2003/0037326 A1 | 2/2003 | Burkhardt et al. |
| 2003/0046372 A1 | 3/2003 | Traxler |
| 2003/0046678 A1 | 3/2003 | Boxall et al. |
| 2003/0056207 A1 | 3/2003 | Fischer et al. |
| 2003/0135851 A1 | 7/2003 | Dickey et al. |
| 2003/0158926 A1 | 8/2003 | Kroening |
| 2003/0163807 A1 | 8/2003 | Drake et al. |
| 2003/0188305 A1 | 10/2003 | Morimoto |
| 2003/0197733 A1 * | 10/2003 | Beauchamp et al. ......... 345/764 |
| 2003/0217359 A1 | 11/2003 | Ohi et al. |
| 2004/0025155 A1 | 2/2004 | Sedlack et al. |
| 2004/0088697 A1 | 5/2004 | Schwartz et al. |
| 2004/0139430 A1 | 7/2004 | Eatough et al. |
| 2005/0055688 A1 | 3/2005 | Barajas et al. |
| 2005/0125524 A1 | 6/2005 | Chandrasekhar et al. |
| 2005/0193389 A1 | 9/2005 | Murphy et al. |
| 2005/0198628 A1 | 9/2005 | Graham et al. |
| 2005/0289513 A1 | 12/2005 | Chen et al. |
| 2006/0048139 A1 | 3/2006 | Nakamura |
| 2006/0053419 A1 | 3/2006 | Barfield et al. |
| 2006/0069754 A1 | 3/2006 | Buck et al. |
| 2006/0200656 A1 | 9/2006 | Cardinell et al. |
| 2006/0277183 A1 | 12/2006 | Nichols et al. |
| 2007/0028231 A1 | 2/2007 | Kelso et al. |
| 2009/0132996 A1 * | 5/2009 | Eldridge et al. ............. 717/108 |
| 2009/0300578 A1 | 12/2009 | Neil |

OTHER PUBLICATIONS

Digital Equipment Corporation, "RSX-11 Utilities Manual", "Digital Equipment Corporation", Jun. 1979.

* cited by examiner

DIGITAL ASSET DELIVERY SYSTEM AND METHOD

CROSS-REFERENCE TO RELATED APPLICATIONS

This application is a divisional of and claims benefit of U.S. patent application Ser. No. 13/565,540 filed Aug. 2, 2012, titled "METHOD AND SYSTEM FOR SOFTWARE DELIVERY" (which issued as U.S. Pat. No. 8,661,406 on Feb. 25, 2014), which is a divisional of and claims benefit of U.S. patent application Ser. No. 12/144,598 filed Jun. 23, 2008, titled "SYSTEM AND METHOD FOR SOFTWARE DELIVERY" (issued as U.S. Pat. No. 8,245,185 on Aug. 14, 2012), which is a continuation of and claims priority to PCT/IB2006/054788 filed Dec. 12, 2006 (WO 2007/072310), which claims priority to U.S. Provisional Patent Application Ser. No. 60/753,635, filed Dec. 22, 2005, each of which is incorporated herein by reference in its entirety.

FIELD OF THE INVENTION

The present invention relates generally to software delivery.

BACKGROUND OF THE INVENTION

Electronic devices and, more specifically, computers, were historically built-to-order (BTO) or built-to-plan (BTP). Early commercial mainframes were configured to a customer specification from a set of hardware options. Initial production of personal computers (PCs) required manufacturers to forecast demand for standard models and mandated that retailers and value-added resellers (VARs) handle customization.

Today, some PC manufacturers use a BTO model by working directly with customers, either by phone or by using the World Wide Web (WWW). The BTO model can allow a consumer to customize computers by providing choice of processor, clock speed, type of communications devices, size of hard drive, and amount of semiconductor memory, which can include dynamic read/write memory (DRAM) and video buffer.

As the industry has consolidated, PC manufacturing has evolved from integrated, in-house manufacture and assembly into a conglomeration of specialized component suppliers and diverse locales connected by air freight and sophisticated, networked supply chain management (SCM) software. Computer components can be supplied from diverse locations. For example, power supplies and displays can originate from Taiwan; DRAMs from South Korea; and disk drives from Singapore. Further, hardware can be assembled by the major electronic contract manufacturers (ECM) or original design manufacturers (ODM) that operate all over the world.

ECMs can build PCs from different manufacturers at a same facility. For example, in a Shanghai ECM facility, one manufacturer's laptops can be built from 9 a.m. to 11:30 a.m. After a short lunch, another manufacturer's laptops can be made until 2 p.m., and so on. At the end of hardware assembly of approximately 15 minutes, the operating system and other software can be loaded, adding another ninety minutes or more to the manufacturing cycle time.

Although at one time PCs were originally vendor-specific and marketed with a choice of hardware-dependent operating systems requiring customers to purchase vendor-specific software which they installed themselves, the PC market eventually consolidated around a Microsoft/Intel (WinTel) standard. Increasing complexity in the operating system drove increasing complexity in program structure.

With MS-DOS, an application developer wrote source code modules, compiled them into object code, and then linked the separate modules into a single executable image file (.EXE). Installing this .EXE file would simply be copying it, along with miscellaneous files such as documentation, data, or fonts, from the distribution medium into a directory of the computer file system and providing a path name for proper reference using a simple batch processing (.BAT) facility.

As the Microsoft operating system evolved, more files had to be copied to multiple locations, information secured in data bases, such as the Registry, and directories, paths, and shortcuts created. To assist with this complex set of tasks, software vendors such as Installshield™ created scripting products (installation wizards), that allowed application developers a flexible means of automating the process of installing software packages using INSTALL.BAT and SETUP.EXE files.

Software installation and deployment is now typically a multipart process. First, a pre-install script runs a series of operations to locate any copies of the same or earlier edition of the particular application and check the release of the operating system, the type and quantity of resources available in hardware, such as display resolution and unused disk storage, old versions of the application, and availability of necessary supporting software. Based on the search, the pre-install script creates an appropriate install script to install the software. Then, the install script typically copies a compacted set of files from a CD-ROM to memory, unpacking or decompressing the files and writing them to temporary (TEMP) files on the hard drive. The install script can create folders, copy hundreds or even thousands of files, create shortcuts, document file extension and MIME associations, create or update .INI and .INF files, set environmental variables, and modify menus. Some of this work is through modifying system files, known within Microsoft operating systems as the Registry.

From the customer perspective, a new buyer must typically enter a serial number—an alphanumeric sequence string of 20-30 characters long—to authenticate software legitimacy. Further, installation is contingent on reading and signaling acceptance of a unique contract, the End-User License Agreement (EULA), that is some 3000 words or more and binds the customer to specific terms of usage. An installation routine can prompt the customer for his or her name and company name, whether he or she wants a complete, partial, or user specified install, whether the default directory is acceptable.

If the installation finds missing or outdated common support elements such as .DLLs and Java classes, the customer can chose how to properly handle remedying the situation. Often, applications fail to load correctly if other applications run during the installation process. When an installation has successfully completed, a customer might be required to immediately register the software with a company and then finally restart the computer to activate the newly installed program.

Even on today's fastest Intel processors and high transfer rate CD-ROMs, application installation can be time consuming. CD-ROM installation is slow partly because the installation engine runs from the CD drive not the faster hard drive.

What is needed is a more efficient method for software delivery and deployment.

BRIEF SUMMARY OF THE INVENTION

An embodiment is directed to an article of manufacture that includes two or more installed, functional software applications organized in a protoset, the protoset configured to enable creation of one or more reduced metasets from the two or more installed, functional software applications, each of the one or more reduced metasets configured to be operable with a predefined computer system independent of the protoset; and a protoset module configured to operate on the protoset to enable creation of the one or more reduced metasets, the module responsive to requests for the creation of the one or more reduced metasets.

Another embodiment is directed to a method for installing software on a computer system. The method includes but is not limited to reading a plurality of component descriptors from a computer readable file, at least one of the component descriptors describing two or more installed, functional software applications organized in a protoset; and performing a reduction operation on the protoset to remove one or more of the two or more installed, functional software applications based on the plurality of component descriptors, the performing a reduction operation producing a metaset of functional software applications associated with the plurality of component descriptors.

Another embodiment is directed to a method for installing data on an electronic device. The method includes but is not limited to reading a plurality of component descriptors from a computer readable file, at least one of the component descriptors describing two or more installed, functional data files organized in a protoset; performing a reduction operation on the protoset to remove one or more of the two or more installed, functional data files, the reduction operation; loading a reference component configured to reference one or more of the software programs; loading an information component configured to enable installation and removal of the data files; loading an executable file configured to enable altering the protoset of data, the executable file configured to generate an altered set of software programs via a removal of one or more software programs from the protoset of software programs; and encapsulating a metadata file to enable the altering the protoset of software programs, the encapsulating creating the protoset of data.

Another embodiment is directed to an article of manufacture including, but not limited to an electronic device operable with installed data components, the installed data components including data components requiring an installation procedure including computationally more computer time than an erasure procedure to remove the installed data components, at least one of the installed data components preinstalled with one or more data components from a protoset of installed data components, the protoset responsive to an indication to erase at least one of the data components in the protoset.

Another embodiment is directed to a computer-implemented method for acquisition of a computer apparatus, the method including but not limited to receiving from an end user a designation of one or more computer apparatus components for the computer apparatus and a designation of a plurality of data files including one or more of software applications and media files; and erasing from a pre-constructed storage device configured with a protoset of functional data files any data files not included in the designation of the plurality of data files received from the end user.

Another embodiment is directed to a computer program product including a signal bearing medium bearing one or more instructions for reading a plurality of component descriptors from a computer readable file, at least one of the component descriptors describing two or more installed, functional software applications organized in a protoset; and one or more instructions for performing a reduction operation on the protoset to remove one or more of the two or more installed, functional software applications based on the plurality of component descriptors, the one or more instructions for performing a reduction operation producing a metaset of functional software applications associated with the plurality of component descriptors.

Another embodiment is directed to a computer system including but not limited to a processor; a memory coupled to the processor, the memory including a module configured to create a reference component configured to reference one or more software programs to be included in a protoset of data files, an information component configured to enable installation and removal of the one or more software programs, and an executable file configured to enable altering the state of the one or more software programs, the executable file configured to generate a requested metaset of software programs via an alteration of one or more of the one or more software programs.

Another embodiment is directed to an article of manufacture including a protoset of software programs capable of being stored as an image on a network, the protoset including: a reference component configured to reference one or more of the software programs; a information component configured to enable installation and removal of the software; and an executable file configured to enable altering the protoset of software programs, the executable file configured to generate a requested set of software programs via a removal of one or more software programs from the protoset of software programs.

Another embodiment is directed to a system for enabling data deployment, the system including means for receiving from an end user a designation of one or more computer apparatus components for the computer apparatus and a designation of a plurality of data files including one or more of software applications and media files; and means for erasing from a pre-constructed storage device configured with a protoset of functional data files any data files not included in the designation of the plurality of data files received from the end user.

BRIEF DESCRIPTION OF THE DRAWINGS

A better understanding of the present invention can be obtained when the following detailed description of the disclosed embodiments is considered in conjunction with the following drawings, in which.

DETAILED DESCRIPTION OF THE INVENTION

Figure 1:
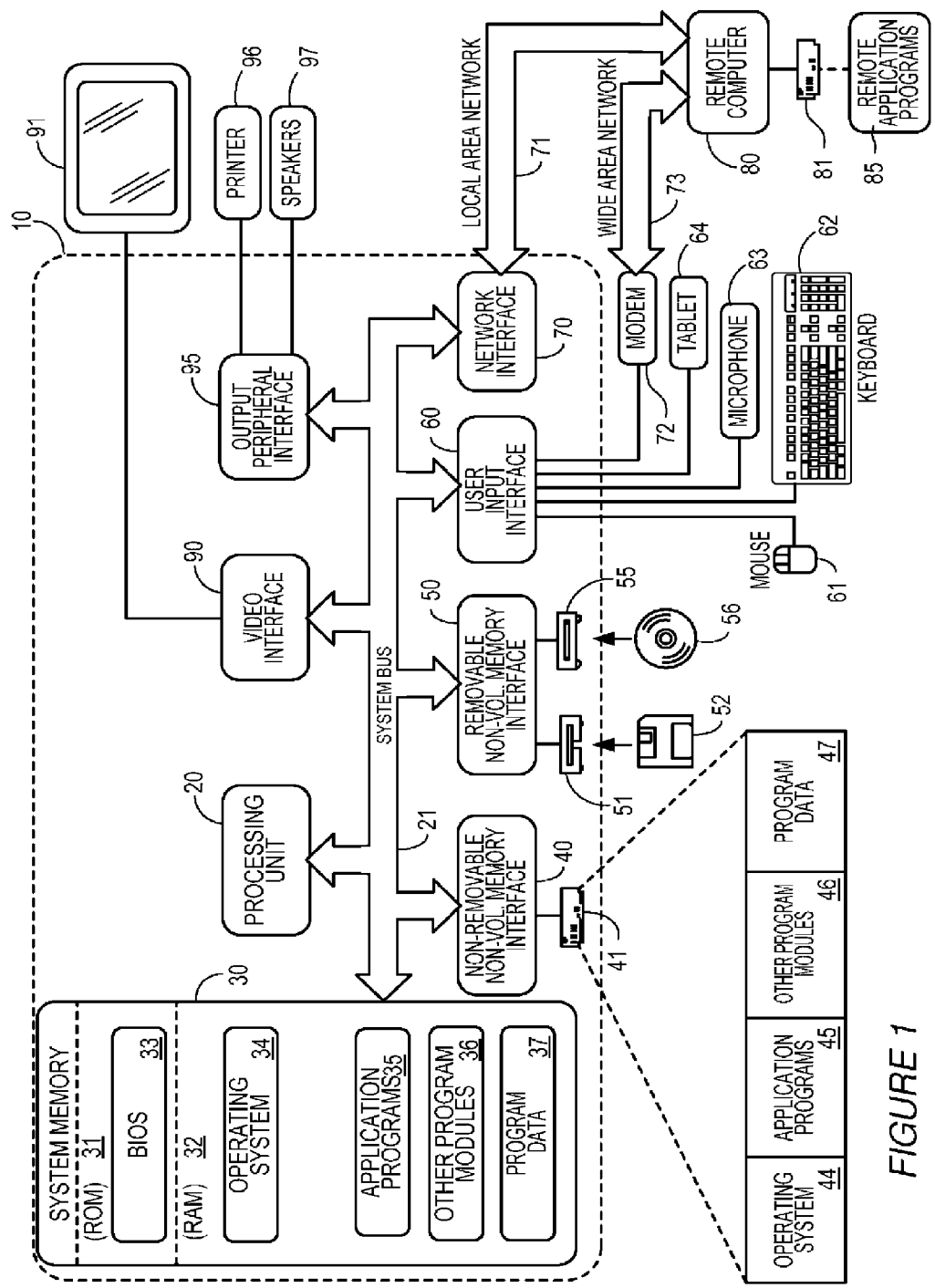
FIG. 1 is a block diagram of an exemplary computer architecture that supports the claimed subject matter.

Those with skill in the computing arts will recognize that the disclosed embodiments have relevance to a wide variety of applications and architectures in addition to those described below. In addition, the functionality of the present invention can be implemented in software, hardware, or a combination of software and hardware. The hardware portion can be implemented using specialized logic; the software portion can be stored in a memory or recording medium and executed by a suitable instruction execution system such as a microprocessor.

Systems and methods presented herein relate to methods for software delivery that avoid requiring a customer to install software. Customizability of software heretofore has been be relegated to consumer-level installation due to the relatively long time necessary to run the scripts for each program compared to the time allocated to economically build a PC or other electronic device. For example, installing a Windows operating system now includes installing functions that were originally separate programs, including, as many as 600 folders requiring 1.5 GB of storage.

According to embodiments herein, consumers can purchase a PC and immediately receive a product completely functional "out-of-the-box," avoiding time-consuming and potentially annoying and frustrating chores such as tracking down programs in a particular category, finding the programs in stock to buy locally or buying them over the Web or other electronic network medium, waiting for shipment delivery or downloading, locating misplaced CDs, agreeing to licenses, running installation programs, selecting options, entering codes, keys, and other registration data, and potentially responding to error messages or restarting downloads.

Other embodiments described herein provide manufacturers a method of selling application software. Large manufacturers, for example, according to embodiments described herein are provided with systems and methods that enable favorable pricing while retaining compliance with quality standards for installation, program function, ease-of-use, and program removal. Further, embodiments described herein enable manufacturers to avoid normal costs associated with inventory, warehousing, shipping and promotion. Large manufacturers can easily stock and dynamically price a greater number of types of software and variety of programs and venders within a particular category. Hardware manufacturers can offer multiple alternatives with minimum incremental costs and eliminate time consuming installation steps.

Other embodiments are directed to methods that enable software vendors to distribute the software content that they develop independent of requiring CD-ROM manufacture and reduce software piracy that stems from sharing program disks among colleagues or friends.

The systems and methods provided reduce the use of boxed, "shrink-wrap" software. A CD weighs a half ounce, the 100 million that are sold in the US each year weigh 1,700 tons. The plastic "jewel box" necessary to protect them weigh an additional 11,000 tons. The cardboard packages add 25,000 tons to the annual waste stream. Additionally, as time is saved by not having to run multiple, time-consuming individual installation programs, thousands of megawatt hours (MWH) of electrical power will be conserved. This reduction in energy usage lowers national fossil fuel consumption and levels of particulate emission with deleterious health effects.

General Computing Environment

With reference to FIG. 1, an exemplary computing system for implementing the embodiments and includes a general purpose computing device in the form of a computer 10. Components of the computer 10 may include, but are not limited to, a processing unit 20, a system memory 30, and a system bus 21 that couples various system components including the system memory to the processing unit 20. The system bus 21 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 10 typically includes a variety of computer readable media. Computer readable media can be any available media that can be accessed by the computer 10 and includes both volatile and nonvolatile media, and removable and nonremovable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 10. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 30 includes computer storage media in the form of volatile and/or nonvolatile memory such as read only memory (ROM) 31 and random access memory (RAM) 32. A basic input/output system 33 (BIOS), containing the basic routines that help to transfer information between elements within computer 10, such as during start-up, is typically stored in ROM 31. RAM 32 typically contains data and/or program modules that are immediately accessible to and/or presently being operated on by processing unit 20. By way of example, and not limitation, FIG. 1 illustrates operating system 34, application programs 35, other program modules 36 and program data 37.

The computer 10 may also include other removable/non-removable, volatile/nonvolatile computer storage media. By way of example only, FIG. 1 illustrates a hard disk drive 41 that reads from or writes to non-removable, nonvolatile magnetic media, a magnetic disk drive 51 that reads from or writes to a removable, nonvolatile magnetic disk 52, and an optical disk drive 55 that reads from or writes to a removable, non-volatile optical disk 56 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 41 is typically connected to the system bus 21 through a non-removable memory interface such as interface 40, and magnetic disk drive 51 and optical disk drive 55 are typically connected to the system bus 21 by a removable memory interface, such as interface 50.

The drives and their associated computer storage media, discussed above and illustrated in FIG. 1, provide storage of computer readable instructions, data structures, program modules and other data for the computer 10. In FIG. 1, for example, hard disk drive 41 is illustrated as storing operating system 44, application programs 45, other program modules 46 and program data 47. Note that these components can either be the same as or different from operating system 34, application programs 35, other program modules 36, and program data 37. Operating system 44, application programs 45, other program modules 46, and program data 47 are given different numbers hereto illustrate that, at a minimum, they are different copies. A user may enter commands and information into the computer 10 through input devices such as a tablet, or electronic digitizer, 64, a microphone 63, a keyboard 62 and pointing device 61, commonly referred to as a mouse, trackball or touch pad. Other input devices (not shown) may include a joystick, game pad, satellite dish, scanner, or the like. These and other input devices are often connected to the processing unit 20 through a user input interface 60 that is coupled to the system bus, but may be connected by other interface and bus structures, such as a parallel port, game port or a universal serial bus (USB). A monitor 91 or other type of display device is also connected to the system bus 21 via an interface, such as a video interface 90. The monitor 91 may also be integrated with a touchscreen panel or the like. Note that the monitor and/or touch screen panel can be physically coupled to a housing in which the computing device 10 is incorporated, such as in a tablet-type personal computer. In addition, computers such as the computing device 10 may also include other peripheral output devices such as speakers 97 and printer 96, which may be connected through an output peripheral interface 94 or the like.

The computer 10 may operate in a networked environment using logical connections to one or more remote computers, such as a remote computer 80. The remote computer 80 may be a personal computer, a server, a router, a network PC, a peer device or other common network node, and typically includes many or all of the elements described above relative to the computer 10, although only a memory storage device 81 has been illustrated in FIG. 1. The logical connections depicted in FIG. 1 include a local area network (LAN) 71 and a wide area network (WAN) 73, but may also include other networks. Such networking environments are commonplace in offices, enterprise-wide computer networks, intranets and the Internet. For example, in the present invention, the computer system 10 may comprise the source machine from which data is being migrated, and the remote computer 80 may comprise the destination machine. Note however that source and destination machines need not be connected by a network or any other means, but instead, data may be migrated via any media capable of being written by the source platform and read by the destination platform or platforms.

When used in a LAN networking environment, the computer 10 is connected to the LAN through a network interface or adapter 70. When used in a WAN networking environment, the computer 10 typically includes a modem 72 or other means for establishing communications over the WAN 73, such as the Internet. The modem 72, which may be internal or external, may be connected to the system bus 21 via the user input interface 60 or other appropriate mechanism. In a networked environment, program modules depicted relative to the computer 10, or portions thereof, may be stored in the remote memory storage device. By way of example, and not limitation, FIG. 1 illustrates remote application programs 85 as residing on memory device 81. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although embodiments are described in the foregoing context, it is not meant to be limiting as those of skill in the art will appreciate that some of the acts and operations described hereinafter can also be implemented in hardware.

Network Environment

According to an embodiment, computer 10 can be configured as a computer that includes a software delivery system. One of the many computer networks suited for use with the present invention is indicated generally at 200 in FIG. 2. Embodiments include those in which the system 200 contains one or more domains or realms, such as one or more Microsoft Windows NT domains or Kerberos realms. The system 200 can include a local area network 202 connectable to other networks 204, including other LANs or portions of the Internet or an intranet, through a gateway or similar mechanism.

The system 200 includes several file or object servers 206 that are connected by network signal lines 208 to one or more network clients 210. The servers 206 and clients 210 can be configured by those of skill in the art in a wide variety of ways to operate according to embodiments described herein. The servers 206 can be configured as Internet servers, as intranet servers, as directory service providers or name servers, as software component (e.g., COM or Java) or other object servers, or as a combination thereof. The servers 206 can be single processor or multiprocessor machines. The servers 206 and clients 210 each include an addressable storage medium such as random access memory and/or a nonvolatile storage medium such as a magnetic or optical disk.

Suitable network clients 210 include, without limitation, personal computers 212, laptops 214, workstations 216, dumb terminals, information appliances, and/or embedded processing systems. The signal lines 208 may include twisted pair, coaxial, or optical fiber cables, telephone lines, satellites, microwave relays, modulated AC power lines, and other data transmission "wires" known to those of skill in the art. Signals according to the invention may be embodied in such "wires" and/or in the addressable storage media (volatile and/or nonvolatile).

A given computer may function both as a client, such as one of network client computers 210, and/or as a server 206. Although particular individual and network computer systems and components are shown, those of skill in the art will appreciate that the present invention also works with a variety of other networks and computers.

The servers 206 and the clients 210 are capable of using floppy drives, tape drives, optical drives or other means to read storage media 222. Suitable storage medium 222 includes a magnetic, optical, or other computer-readable storage device having a specific physical substrate configuration. Suitable storage devices include floppy disks, hard disks, tape, CD-ROMs, PROMs, RAM and other computer system storage devices. The substrate configuration represents data and instructions which cause the computer system to operate in a specific and predefined manner as described herein. Thus, the medium 222 tangibly embodies a program, functions, and/or instructions that are executable by the servers 206 and/or network clients 210 to perform embodiments substantially as described herein.

Figure 2:
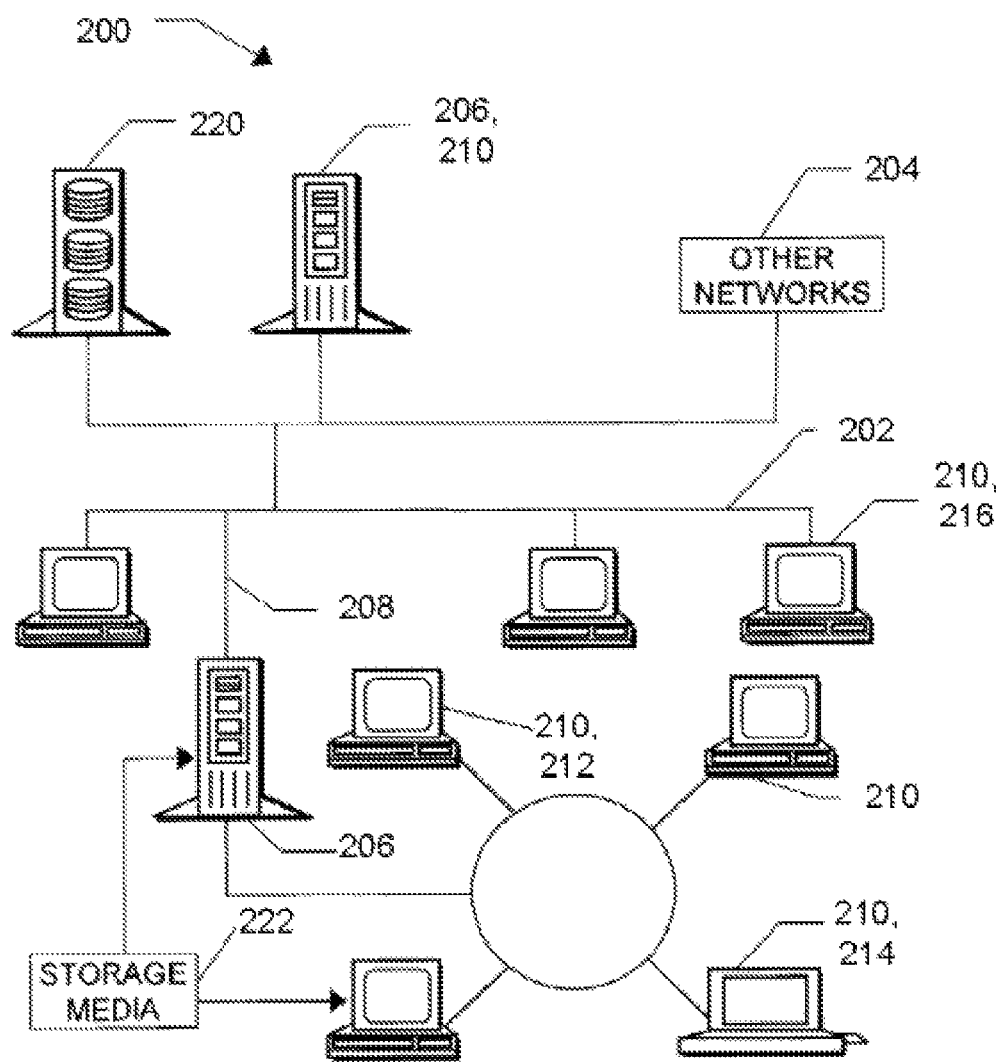
FIG. 2 is a block diagram of an exemplary network environment appropriate for embodiments of the present invention.

FIG. 2 represents an exemplary network capable of enabling one or more embodiments herein. According to embodiments herein, systems and method can include one or more programmable application programming interfaces (APIs). An API refers to a software interface that allows a computer program to invoke another computer program, subsystem, component, library, service or the like.

Electronic Device Environment

Figure 3:
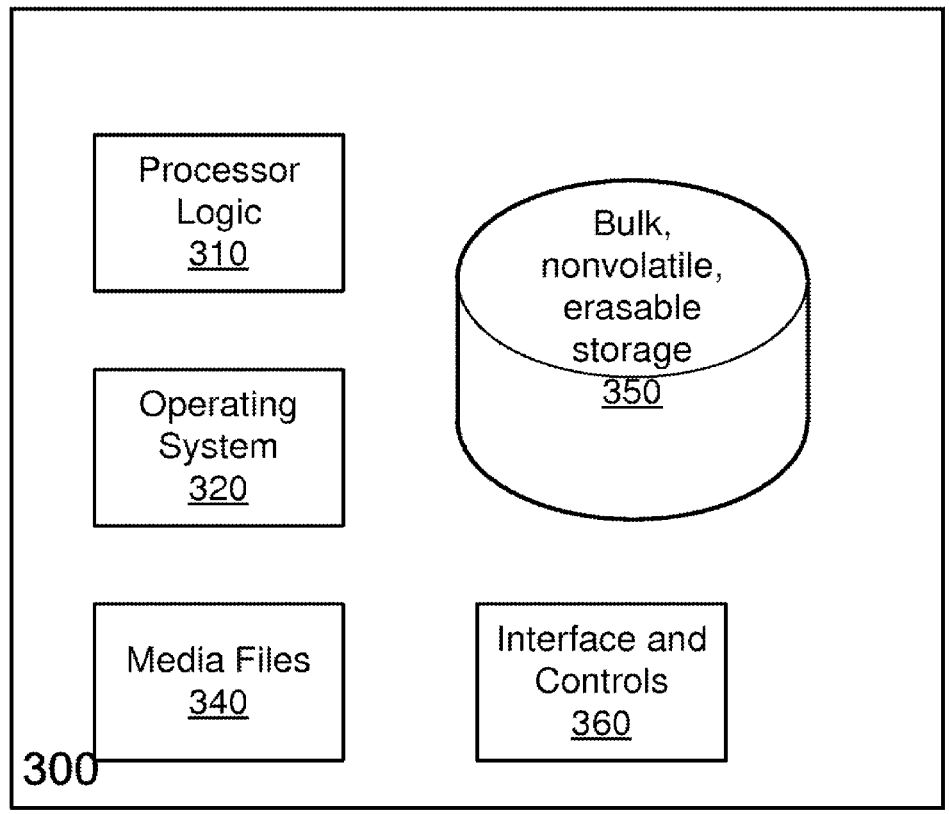
FIG. 3 is a block diagram of an exemplary electronic device environment appropriate for embodiments of the present invention.

Referring now to FIG. 3, an electronic device 300 is shown as a simplified computer system view capable of implementing one or more embodiments of the present invention. FIG. 3 illustrates processing logic 310, at least one operating system (OS) 320, media files 340, bulk, non-volatile, erasable storage 350, and an interface and controls 360. Processing logic 310 can be a microprocessor (CPU), an embedded processor, a system-on-a-chip (SOC), microcontroller, discrete logic, application specific (ASIC) logic or a plurality or mixture of these electronic devices. The OS 320 can be configured to manage the hardware and software resources of a system. In a desktop computer, these resources can include a processor, memory, disk space, etc. In a cellular telephone, they include the keypad, the screen, the address book, the phone dialer, the battery and the network connection. OS 320 provides a stable system for applications to interact with the hardware without having to know all the details of the hardware.

OS 320 can be a general purpose computer operating system, such as a Microsoft Windows variant, for example, Windows XP, XP Professional, Windows Server, or Windows CE. However, it can be another general-purpose computer operating system, such as Macintosh OS, Linux, Unix, AIX, VMS, MVS, or VM or subsets, variations, work-alikes, or similar systems. Further, OS 320 could be a real-time operating system (RTOS) like eCos or Lynx OS for controlling scientific instruments, machinery or industrial equipment. OS 320 could be a specialized or limited operating system for general purpose or embedded processors as found in personal digital assistants (PDAs) like Palm OS and RIM Blackberry OS or cell phones like Symbian OS. OS 320 could be a specialized program like PortalPlayer, developed for personal media players like the Apple iPOD. Operating programs might be implemented partly or completely in hardware or firmware.

Media files are digital representations of computer program applications, drawings, images, graphics, music, video, movies, fonts, maps, ring tones, games, books, audio books, radio programs, television programs, language and other course materials, recipes, business data etc.

Storage 350 can be configured to store multiple digital media files. For the purposes of embodiments described herein, storage 350 can store multiple files (bulk storage). What is commonly referred to as "erasing" for purposes of embodiments herein can include marking file system table entries as unused.

Rotating storage devices appropriate purposes of embodiments herein can include fixed or removable types such fixed disk drives, removable disk drives, erasable compact disk media and their associated drives (CD-RW and variants) and particularly high capacity, erasable DVD disks with their associated media drives (DVD+RW, DVD-RAM, DVD-HD, and DVD-BluRay). Other appropriate storage includes solid-state semiconductor EEPROM, Ramdisk, memory cards (e.g., CompactFlash, Memory Stick, SmartMedia, MultiMediaCard, Secure Digital, xD), and flash memory. Tape can also be used by certain embodiments. In one embodiment, storage includes a disk drive sometimes referred to as a "hard drive".

Interface and control 360 occurs through a plurality of display screens, sound, vibration, switches, mechanical or electronic dials, keyboards, voice commands, wired connections, or wireless control.

Electronic device 300 can include one or more of a personal computer, laptop computer, server, enterprise computer, personal media player, audio player, video server, digital printer, fax machine, TV interface box, personal video recorder, camcorder, cell phone, flat panel television, digital picture frame, personal digital assistant, digital game console, electronic book reader, directional navigation system, digitally-enabled appliance and machinery, and the like.

Method for Deploying Software

Embodiments described herein relate to systems and methods for deploying software that address problems inherent in systems of deployment that depend on an infrastructure that fails to take advantage of symbiotic possibilities between hardware and software manufacturers. More particularly, embodiments herein provide methods for deploying software that enable a paradigm shift away from viewing hardware and software as necessarily separate genres for all purposes. Rather, embodiments herein provide methods for linking hardware and software to cause a juxtaposition of symbiotic traits of each to create a business milieu that benefits deployment of both software and hardware.

Key to enabling a paradigm shift is building a "protoset" (also sometimes referred to herein as a "panoplex"). In one embodiment, a protoset is a master set of digital assets (where digital assets include, for example, software programs, digital music, images, motion video, e-books, and fonts) that enables a subtractive function for creating metasets of installed functional digital assets like programs (this subtractive function is sometimes referred to herein as "gryphing"). The protoset can enable different states of metasets, including a metaset including an InstallShield with a set of instructions to enable altering the state of programs within the metaset. A protoset can also enable states for software programs on a metaset such as a latent state, an installed functional state, and a removed program state, herein referred to as a "null" state.

In certain embodiments, gryphing can occur after the device is manufactured but before first consumer use. In these applications the panoplex files are only available through a secure interface protected from the consumer. This protection may be gained by different methods such as BIOS features, special disk formatting or forms of file encryption. An example of creating such a protected area is the Apple iPod which employs software from (www.portalplayer.com) and RTXC from Quadros Systems (www.quadros.com) where files can be loaded and seen on the iPod as if it were a USB storage drive. However, tunes loaded using the iTunes software are not visible or accessible to an external computer. For PC applications, Phoenix Technologies' Core Managed Environment (CME) (www.phoenix.com) makes a set of BIOS enhancements that enable such protected disk regions.

Retailers may also provide gryphing. In a preferred embodiment, the manufacturer selling computers via a retailer or reseller uses a BIOS that effectively protects and hides the panoplex. When the computer is initialized, it can only connect to a network and transmit the .ppx panoplex information to an authorized selling site. The selling site creates a menu with the available digital assets and prices them. The buyer chooses the ipselecta and provides a means of payment. On credit approval, the sales site transmits a signed code with a certified relicta .rel. The computer uninstalls all assets in the relicta, makes the digital assets accessible and erases the gryphing software.

To create a working protoset, in one embodiment, the protoset is created with conflict checking, regression testing and the like. Once a protoset is built, an "image" of the protoset can be created to enable distribution of the protoset via a network or the like. Regression testing can be performed to ensure that all functional programs on the protoset can work together without conflict. Regression testing can include testing every permutation and combination of installed programs, random checking of installed programs, and the like.

In one embodiment, regression testing is made unnecessary via program isolation. More particularly, program isolation is achieved in the protoset by altering each installed program component via "sandboxing" installed software components.

In one embodiment, the protoset is built using partitions to support program isolation if necessary. In other embodiments, the protoset includes a master catalog of programs. The catalog can include metadata to enable removal of unwanted programs. Further, the master catalog of programs can include multiple subsets identifying programs by type, usage, and the like. For example, protosets can be developed to enable installation of a hard drive holding a metaset of fully functional programs on a server, in a business, in a home and the like.

In one embodiment, the protoset can be cloned. The cloned protoset can include a subtraction function to enable a user of a protoset to select from the program catalog which application programs to remove from a cloned protoset. The subtraction function can be configured to operate at a manufacturing facility, a retail establishment, and/or over a network.

In one embodiment, after the subtractive function operates on a protoset to create a metaset, a defragmentation program can be instantiated to insure that the removal of one or more programs from the protoset do not cause an inefficient hard drive.

Protoset Creation Detail

Embodiments described herein provide different methods for creating a protoset with installed software. In one embodiment, a manufacturer installs each program using Windows Installer (.MSI) facility using .MSI install routines supplied by one or more software vendors or the like. The installation can take into account a hardware manufacturer's best practices, such as application isolation requirements. The .MSI install routines can be configured to follow Microsoft's Component Object Model usage guidelines for ensuring backwards compatibility, embedding and maintaining correct version resource information, comparing numerical version number resource before overwriting older versioned files, installing to shared directories, and registering required files. In one embodiment, .MSI install routines can be configured to install and uninstall programs and program features at a component level. In one embodiment, the software vendor installation routines can be configured or required to enable documentation regarding the files installed or modified by the installation routines.

Program Isolation

After installation of software programs in the protoset, the programs can be isolated from one another. More particularly, software application programs can be isolated using, for example, .NET assemblies or Win32 Assemblies and .Manifest files in a Windows environment to compartmentalize each application program or groups of application programs.

In one embodiment, one of the software application programs can include an operating system. If an operating system is included in the installed programs in a protoset, additional operations can be implemented to insure workability of the installed programs with the installed operating system. Alternatively, in one embodiment, the operating system is installed in a "sand box" environment requiring additional installation operations to enable the operating system to operate with one or more installed programs on the protoset. For example, the protoset can include a partitioned environment as is known. The partition can separate the operating system from one or more of the software application programs.

After installation of the software programs, a protoset cleansing operation can be implemented that can include removal of installation debris, mostly .temp files and unnecessary drivers.

Once the cleaning operation is performed, according to an embodiment, the operating system, if present in the protoset can be altered to enable efficient operating system performance.

After a complete protoset with or without an operating system is created, a manufacturer of the protoset can store the protoset as a single bit-image in a networked server environment, store the protoset on a hard drive for distribution or store clones of the protoset on one or more hard drives to enable various entities in a distribution chain to have a protoset copy. For example, an ECM, hardware manufacturer, software manufacturer can each have a clone copy of a protoset. Alternatively, an ECM or other distribution entity can be given download access to a protoset stored at a network location. If the protoset provides for regular updates, the ECM or other distribution entity can receive on the fly updates of protoset changes. Thus, when creating a metaset, an ECM or other distribution entity will be able to have a most-recent version of the software application requested by a purchaser or retail establishment. ECM downloads can be over a network environment from a server, as one of skill in the art with the benefit of the present disclosure will appreciate.

In one embodiment, each complete protoset can be stored with references to the programs installed and include changes necessary to install and uninstall each program within the protoset.

Protoset Duplication

According to an embodiment, a manufacturer of protosets or an entity in a distribution chain of protosets can provide for disk copying via loading a protoset bit image onto multiple master formats that are duplicated into banks of disk drives. For example, a copier can be configured to copy with certain technologies more than three gigabytes of disk image per minute. Thus, an 80 gigabyte disk can be fully loaded in under 25 minutes. The speed with which a hard drive can be loaded is a function of the speed of the hard drive, seek times, rotations per minute and the like. Thus, as will be appreciated, a distribution entity, such as an ECM, receiving a build order, could also receive the specification for type, speed, and capacity of a requested hard disk. Additionally, an ECM could receive a list of software application programs to be included on a metaset.

Product Validation for Protoset Products

When a software application is a candidate for adding to the protoset of software applications, in one embodiment, a process is used to validate that the candidate application does not conflict with the applications that are already part of the superset and the application is then added to the protoset of products that are described in a list of protoset products which can be listed in a metadata store.

The process of validation can eliminate installation packages that can cause conflicts. The data in the installation package that can cause conflict can be the result of design choices made by the author of the package. The creation of the protoset and a set exclusion method can be configured to allow an application and an installation package to use an alternative design that eliminates the potential cause of the conflict.

Figure 4:
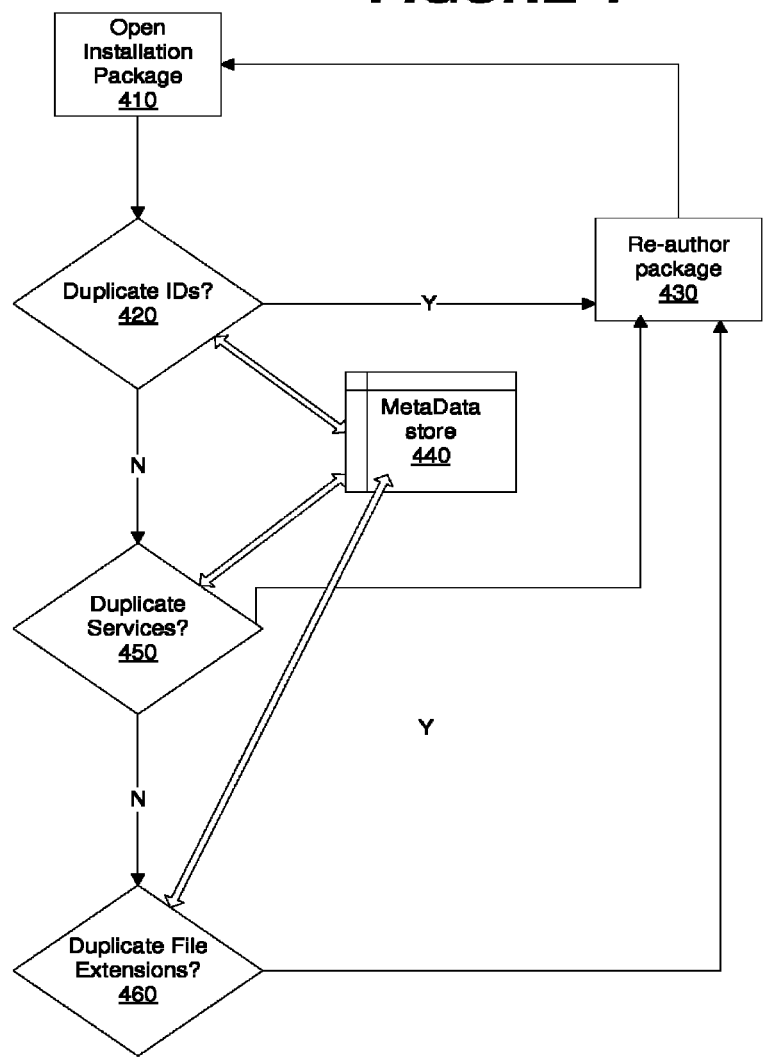
FIG. 4 is a flow diagram illustrating a method in accordance with an embodiment of the present invention.

Referring to FIG. 4, a method for including an application installation package is provided. Block 410 provides for opening an installation package.

For the candidate application package to fit into the protoset there must be no conflicts of application data or installation behavior between the candidate and the rest of the protoset. The installation package at block 410 contains the data and instructions that install the software application onto the computer. The metadata store contains data about the products that are already part of the protoset. One of the purposes of the metadata store is that it is a repository for data about the protoset used during the set exclusion process that produces a subset of software products from the protoset. During the validation process, the metadata is used to verify that there are no conflicts between the candidate installation package block 410 and the rest of the protoset.

The metadata store contains the unique universal identifiers (UUIDs) of products already in the protoset. Decision block 420 determines whether duplicate identifiers are found. More particularly, a candidate installation package is checked against the existing UUIDs to ensure that the proposed UUID does not already exist. In the Windows Operating system, block 420 can be performed using the type of code in this example Visual Basic script:

```
Database = Installer.OpenDatabase (the MSI installation package)
View = Database.OpenView (' Select 'Value' from 'Property' where
'Property'.'Property' = 'ProductCode')
View.Execute
    Set Record = View.Fetch
    ProdID = Record.StringData(1)
    View2 = Database.OpenView ((' Select 'Value' from 'Property'
    where 'Property'.'Property' = 'UpgradeCode')
    View2.Execute
    Set Recede = View2.Fetch
    UpgradeID = Record.StringData (1)
```

The two UUIDs that need to be unique are the Product and Upgrade IDs. ProdID and UpgradeID in the script code. When they have been retrieved from the candidate installation package the metadata store is searched to ensure that these Universal identifiers do not already exist.

If there are duplicate UUIDs, block 430 provides for re-authoring the installation package to alter the identifiers. Conterminously, block 420 and block 440 interact to alter a metadata store. If there are no duplicate UUIDs, the validation proceeds to ensure that there are no duplicated services.

If no duplicate identifiers are found, control passes to decision block 450 which provides for determining whether duplicate services are required by the installation package program. Because the associated program services and settings are required to be unique to an instance of an operating system on a computer, no two products can install one of the same name.

If duplicate services are found, control passes to block 430 which provides for re-authoring the package. If no duplicate services are detected in decision block 450, control passes to decision block 460 which determines if there are duplicate file extensions.

On a Windows operating system, a Windows Service is required to have a unique name, and therefore more than one product cannot install a Service that has the same name as an existing one. To ensure that there are no duplicate Service names, the Service names are retrieved from the candidate installation package and compared with Service names already in the metadata store. The following code is an example of retrieving the Service names from the candidate installation package. Code appropriate for implementing block 450 could include the following:

```
Database = Installer.OpenDatabase (the MSI installation package)
View = Database.OpenView (' Select 'Name' from 'ServiceInstall')
Do
    Set Record = View.Fetch
    ServiceName = Record.StringData(1)
    Comment Check that the Service named ServiceName is
    not in the metadata store
    Loop until Record is Nothing
```

Files on a computer system are opened by an application when the user opens a file with a particular file extension. The file extension (such as txt or mp3) is registered to the operating system to be opened by a particular application. Block 460 determines if the candidate product will open a file extension and determines if there is already a product in the metadata that opens the same file extension. A candidate product that uses the same file extensions as an existing product can create a possible conflict. Thus, in one embodiment, a module is configured to determine which product should have priority when a file with that file extension is opened by the operating system.

Block 460 provides for checking that there are no duplicated file extensions is performed in a similar way. On a Windows operating system the script that shows how this would be done is as follows:

```
Database = Installer.OpenDatabase(the MSI installation package)
View = Database.OpenView (' Select 'Extension' from 'Extension')
Do
    Set Record = View.Fetch
    FileExtension = Record.StringData(1)
    Comment Check that the file extension is not in the
    metadata store
    Loop until Record is Nothing
```

If duplicate file extensions are found, control passes to block 430 for re-authoring. Conterminously, control is provided to metadata store 440.

Validation Process for New Installation Packages

Figure 5:
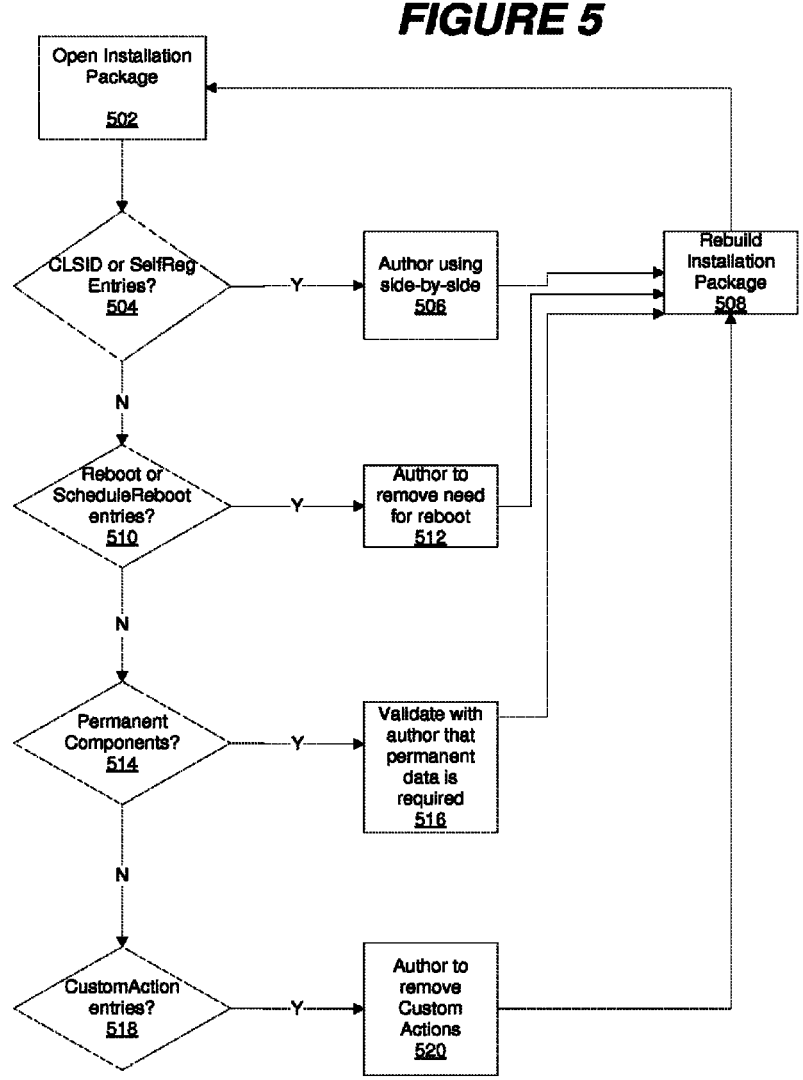
FIG. 5 is a flow diagram illustrating a method in accordance with an embodiment of the present invention.

Referring to FIG. 5, a flow diagram illustrates a validation process for received new installation packages for use in a protoset. Block 502 provides for opening an installation package. The content of the installation package is examined for items that can conflict with other applications in the superset.

Block 504 is a decision block asking if the installation package includes a class identifier (CLSID) or self registration entry. An example of one of the items that may cause conflict in a Windows operating system is the use of Component Object Model (COM) classes that may be shared with the other applications in the superset. The requirement for this validation step is that the Class and SelfReg tables contain no entries.

Because of the potential for conflict, COM classes must be installed in the side-by-side mode that makes them private to the using software application, not shared between all applications. This means that there must be no COM class registration in the installation package for the software application. The validation can be implemented using example Visual Basic script as follows, which tests for the presence of entries in the Class and SelfReg tables in the installation package:

```
Database = Installer.OpenDatabase(the MSI installation package)
View = Database.OpenView ('Select CLSID from Class')
View.Execute
Classdata = View.Fetch
```

If conflicts are resolved, the installation package is authored in block 506, followed by rebuilding the installation package in block 508. More particularly, if Classdata is empty, then there are no CLSID entries.

Block 504 also provides for determining if there are any self registration entries. Code for determining self regulation entries could include:

```
View2 = Database.OpenView ('Select File from Class')
View2.Execute
SelfRegData = View2.Fetch
If SelfRegData is Nothing there are no entries in the SelfReg table
```

Next, if the installation package does not include CLSID or self registration entries, decision block 510 provides for determining a reboot or schedule reboot entries. In block 510, an installation package that causes a reboot of the computer system interferes with the process of creating the protoset. If the application in the package is removed from the protoset during the CreateMetaset API call and causes a reboot, the reboot delays the creation of the final protoset and can be a hold-up when used during a manufacturing process.

The requirement for validation at block 510 includes insuring that the execute sequence in the installation package contains no Reboot or ScheduleReboot entries.

A Visual Basic script example of the validation to insure no reboot requirements could include the following code:

```
Database = Installer.OpenDatabase(the MSI installation package)
View = Database.OpenView ('Select Action from InstallExecuteSequence where
Action = 'Reboot')
View.Execute
RebootData = View.Fetch
If RebootData is not Nothing there are Reboots
View2 = Database.OpenView (' Select Action from
InstallExecuteSequence where
Action = 'ScheduleReboot'
View2.Execute
SchedData = View2.Fetch
If SchedData is not Nothing there are scheduled reboots in the package.
```

Referring back to FIG. 5, block 512 provides for an author to remove the need for a reboot. If not, block 514 provides for determining if permanent components are included in the installation package. More particularly, permanent components should not be added to a computer system when the installation package is installed. A permanent component is one that is not uninstalled when the application is uninstalled. Thus, unnecessary files or registry entries would remain on the computer system. The permanent components typically are not used by the software applications that remain after the CreateMetaset API is called, and they occupy disk space.

Therefore, a validation process could include block 514 to require that none of the components are marked to be permanently installed. A Visual Basic script example of the validation is as follows:

```
Database = Installer.OpenDatabase(the MSI installation package)
View = Database.OpenView ('Select Attributes from Component')
View.Execute
Do
   Set AttributeRecord = View.Fetch
   AttributeValue = AttributeRecord.IntegerData(1)
   If AttributeValue and OxOOlO is non zero, the component is
   permanent
   Loop until AttributeRecord entries are processed for each component.
```

As shown in the script, block 516 provides for validating with an author that permanent data is required, followed by rebuilding the installation package at block 508.

Next, decision block 518 determines whether the installation package includes custom action entries. More particularly, custom actions are custom code that the author of the installation package has added to be run during the install or uninstall of the application. Custom code can break validation because such code violates the rules that determine that the installation package does not conflict with other applications in the protoset.

As an example, the custom code in a custom action can create a COM registration entry or cause the computer to reboot. The requirement for validation can include requiring that the installation package contains no custom actions. An exemplary script can include:

```
Database = Installer.OpenDatabase(the MSI installation package)
View = Database.OpenView ('Select Action from CustomAction')
View.Execute
CaData = View.Fetch
If CaData is not Nothing there are custom actions
```

As provided in the exemplary script, if there are custom actions, block 520 provides for the author to remove custom actions, followed by block 508 rebuilding the installation package.

Part of the installation process can include regression testing. Regression testing verifies that all programs comprising the protoset are properly installed and function properly.

Adding Products to a Protoset

A product is added to a protoset by installing it on a template computer. Also, the product's information is added to the metadata describing the protoset. The data is the same data that is used in the validation steps described above. These items include, but are not limited to, Product ID, Upgrade ID, the names of Services being installed, file extensions that the product creates or processes.

The metadata for the protoset can be maintained for each product added to the protoset. In some circumstances (such as recovery from loss of the metadata) it can be recreated by performing an inventory of the protoset products because they are installed on the computer and a program can use operating system APIs to retrieve the data.

Below is an exemplary script that produces a list of the Product IDs, Product names and the location of the setup package containing data about the product:

```
Option Explicit Public installer, fullmsg, comp, prod, a, fso, pname, ploc,
package
Set fso = CreateObject('Scripting.FileSystemObject")
Set a = fso.CreateTextFile("prods.txt", True)
' Connect to Windows Installer object
Set installer = CreateObject("WindowsInstaller.Installer")
on error resume next
For Each prod In installer.products
pname = installer.productinfo (prod, "InstalledProductName")
package = installer.productinfo (prod, "LocalPackage")
ploc = installer.productinfo (prod, "InstallLocation")
a.writeline (prod & " " & pname & "Package at " & package)
Next
```

In this code, "package" is the path to the setup file as cached on the computer. Using this path, the Upgrade ID can be retrieved as follows:

```
Function UpgradeID (package)
Dim Database, UpgradeData
Set Database = installer.OpenDatabase (package, O)
UpgradeID = GetProp (Database, "UpgradeCode")
Set Database = Nothing
end Function
Function GetProp (Database, whatprop)
Dim view, record, aprop, qry
qry = "SELECT 'Value' from 'Property' WHERE 'Property'.'Property' =
    '" & whatprop & "'"
Set view = Database.OpenView(qry)
view.Execute
Set record = view.Fetch
If record Is Nothing Then Exit Function
GetProp = record.StringData(1)
    End Function
```

Creation of the Metaset

After a protoset is created and sold to a customer, the product can be altered if the applications purchased are a subset of the protoset applications. In an embodiment, after purchase, a protoset will include or have access to an executable file that is used to uninstall the programs of the protoset that are not purchased. The executable file can be generated by taking the list of programs authorized and purchased and comparing them to the list of programs in the protoset using the logical greater than function to generate the list of programs to be uninstalled resulting in this Boolean truth table:

| Installed | Authorized | Erase |
|---|---|---|
| 1 | 0 | 1 |
| 1 | 1 | 0 |
| 0 | 0 | 0 |
| 0 | 1 | 0 |

This is logically equivalent to Boolean ANDing the members of the protoset with the selected set and keeping those programs logically true.

The list of programs to be uninstalled can be keyed to look up the related removal packages in a master program data base, which are in turn collected to become a single executable uninstall file.

Next, each disk can be attached to a networked PC or local PC and booted. Using remote administration capabilities, the PC executes the specific uninstall batch file generated for the order for which the disk is being configured.

Next, each PC uninstalls the files necessary to remove the programs within the protoset that are not selected by the individual purchaser. In one embodiment, a data base can be configured to track common files such as fonts that might be used by multiple programs and only trigger an erase when all programs referencing those files are uninstalled.

In one embodiment, the PC runs a batch registry update that installs user specific information. Next, the PC can run a registry cleanup program that checks for registry coherence and removes unnecessary registry keys, files, file associations, and shortcuts. The PC then can be configured to check that necessary files are installed. The PC cleans association data so that an end user can choose from available programs for default associations. In one embodiment, the PC performing the user associations is a manufacturing PC, a retail entity PC, an ECM PC. In other embodiments, the PC performing user associations is a user PC.

In one embodiment, the PC performing user associations advantageously is a manufacturing PC or non-retail PC, which moves the hard drive from the manufacturing PC to the specific PC specified by the order. More specifically, a non-retail PC performing the user associates benefits a process by copying and uninstalling programs independently of (in parallel to and balanced with) the hardware manufacturing process, to enable a hardware manufacturer to install build-to-order software without changing the hardware build cycle time.

Figure 6:
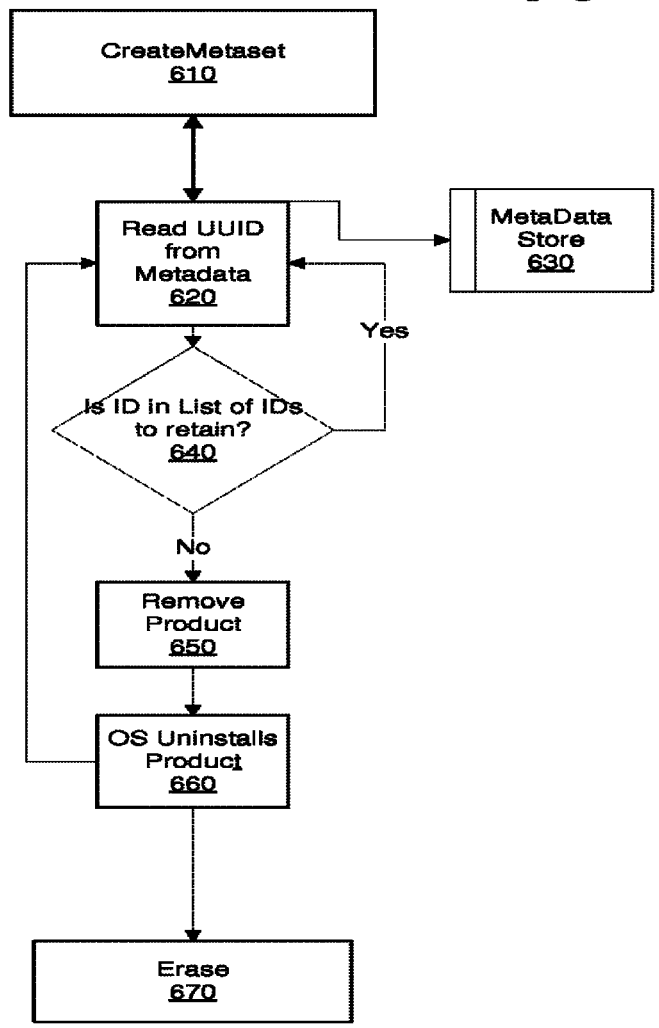
FIG. 6 is a flow diagram illustrating a method in accordance with an embodiment of the present invention.

Referring now to FIG. 6, a block diagram illustrates a method for creating a metaset from an existing protoset of software applications specific to a Windows environment. The block diagram further illustrates how a computer system can be modified by removing the software applications or files that will not be used when the computer is put into service. After creation of a protoset, the software applications therein are a set of installed applications that have been validated to be compatible with each other using a validation process.

On a Windows Operating System, a hard drive can be configured to hold files and registry data describing the software applications of the protoset. To create a metaset of applications that is a subset of the protoset, block 610 provides for running a script or other module "CreateMetaset" to generate the required set of applications for the metaset.

Block 620 identifies that the script/module reads from metadata or other list a reference to one or more of the installed software applications using a unique universal identifier (UUID). The unique universal identifiers can relate back to when the protoset was created and match the software applications in the protoset. Upon creation of a list of software applications to be included in a metaset, the protoset can be modified by uninstalling one or more of the software applications using a corresponding UUID.

In an alternate embodiment, an inventory of a computer system holding a protoset can be used to locate the UUIDs associated with each application. The choice of method for identifying application programs on a protoset is subject to system requirements and may or may not have efficiencies of scale associated with the inclusion of metadata information to identify the UUIDs. Further, in one embodiment, a removal API can be supplied with a list of UUIDs that are to be retained on the computer. The API can then enable enumeration of each of the UUIDs in either the metadata or a list created by an inventory process. Those UUIDs that are not in this list to be retained can then be erased via the API, associated program or another method. For example, a software application having a UUID associated therewith could be erased using the API or another method associated with the list of programs to be erased.

FIG. 6 illustrates that a metaset can include a metadata file/store 630 to hold the UUIDS that identify the products installed in the protoset. Store 630 can include a set of UUIDs defining the software products that are required to be retained on the computer in its final state (metaset). An Application Programming Interface (API) can be configured to pass the list of UUIDs that are required via the API. An example of a call to this API implemented as a Component Object Model (COM) object and called from a Visual Basic script client program could be:

```
Set ProtosetManager = CreateObject("Protoset.Manager")
ProtosetManager.CreateMetaset (list of UUIDs to retain)
```

The first line of the API script can be configured to create a COM object. The second line can be configured to pass the list of UUIDs that the calling program requires as the final set of installed software products on the computer system.

According to an embodiment, the API can read each UUID entry from the metadata store at 630 and then at 640 check if the UUID retrieved from the metadata store 630 is part of the list of UUIDs that was passed as a parameter to CreateMetaset. If the UUID is present in the list, a call fetches the next UUID from the metadata store 630 and repeats as shown in block 640. If the UUID is not in the parameter list, block 650 provides that the CreateMetaset API removes the UUID for the product that was retrieved from the metadata store 630.

Next, block 660 provides that the operating system then uninstall the product. After the product is uninstalled, an erasure, such as in the hardware is performed as shown in block 670.

In pseudo-code, CreateMetaset can be configured as follows:

```
CreateMetaset (list of UUIDs to retain)
{
For each (UUID ProductID in metadata list of UUIDs)
    {
    If ProductID is not in list of UUIDs to retain
        {
        UninstallProduct (ProductID);
        }
    }
}
```

Using a Windows Installer API call into the operating system, the call to UninstallProduct (ProductID) is a call on the Windows Installer ConfigureProduct API using the scripting interface as follows:

```
Set installer = CreateObject("WindowsInstaller.Installer")
installer.ConfigureProduct ProductID, 0, 2
```

When the CreateMetaset module is complete, the computer contains the software applications that are appropriate for a particular metaset.

Metaset Verification Procedure

Figure 7:
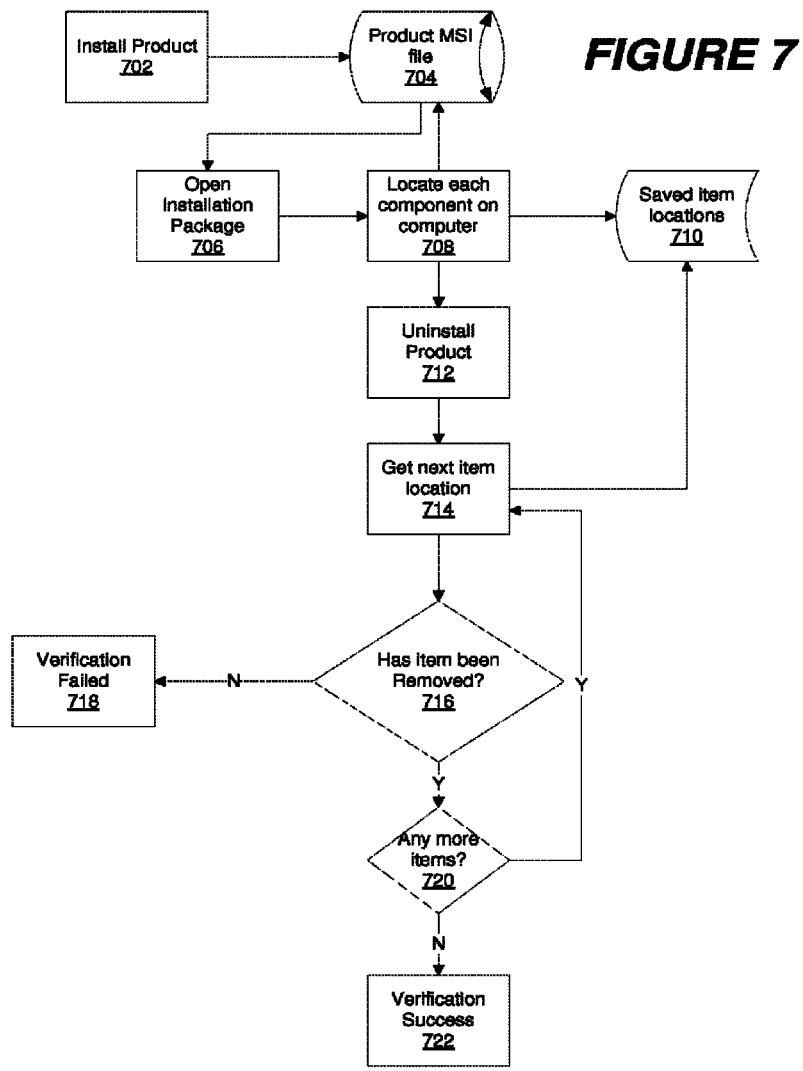
FIG. 7 is a flow diagram illustrating a method in accordance with an embodiment of the present invention.

Referring now to FIG. 7, a flow diagram illustrates one embodiment for the verifying that a metaset is complete. The metaset verification can be configured to operate upon detection of an installed product into a protoset 702 or other alteration to a product .MSI file 704. Upon such detection or other instantiation of the module, block 706 provides for opening an installation package 706.

Verification of removal is performed after a product has been installed. An installation produces files, registry data and other configuration data. After installation, an .MSI file that previously was used to install the product can be used to locate the components installed on the computer.

At block 706 Open Installation Package, each component in the MSI file's Component table is located on the computer by calling the Windows Installer.ComponentPath API. The returned location is a file name, a directory name or a registry entry.

```
Sub ListComponents
Dim view, record, componentid, componentpath, fullmsg
fullmsg = "Product " & ProductGuid
a.WriteLine (fullmsg)
Set view = Database.OpenView("SELECT 'Componentid' FROM
'Component'")
view.Execute : CheckError
    Do
    Set record = view.Fetch : CheckError
    If record Is Nothing Then
        Exit Do
    end if
    componentid = record.StringData(l)
    componentpath=""
    componentpath = Installer.
    ComponentPath (ProductGuid, componentid)
    if componentpath <>"" then
        a.WriteLine (componentpath)
    end if
Loop
End Sub
```

The above subroutine can be called after the MSI file has been opened. The code retrieves each component from a Component table and then uses Installer.ComponentPath to return each component location. When the stored locations are file paths they contain the location of the item being installed, such as these two examples:

```
C:\Program Files\Microsoft Off ice\Visiol 1\VISIO.EXE
C:\Program Files\Microsoft Off ice\Visiol 1\VISPRX32.DLL
```

After the product has been uninstalled, the verification program gets each of these locations and verifies that the file at these locations has been uninstalled.

As shown in FIG. 7, block 708 provides for locating each component on a computer and comparing the component with the product .MSI file and a saved item locations store 710. Specifically, the returned location found in block 706 is stored for future reference. If the product is determined as requiring deletion, block 712 provides for uninstalling the product.

More particularly, each stored item location identified in block 710 is enumerated, and for each item location the verification program checks that the item at that stored location has been removed. As an example, a component in the Component table of the MSI file could be installed to C:\Program Files\MyCompany\MyFile.exe. The verification program calls the Windows Installer.ComponentPath function passing in the Product UUID and the Component ID from the Component table, and the returned value is the location C:\Program Files\MyCompany\MyFile.exe. The location is stored in a file. When the product is uninstalled, the verification program looks at each stored location to check that the file at C:\Program Files\MyCompany\MyFile.exe has been removed.

Block 714 then provides for getting a next item. Decision block 716 provides for determining whether the item has been properly removed. If not, block 718 provides an alert that verification failed. If the item was properly removed, block 720 provides for determining whether additional items require verification of removal. If all items have been successfully removed per the list, a verification success is identified at block 722.

Creating a metaset representing a final subset of installed products from the protoset requires uninstalling the unwanted products. According to an embodiment, the uninstall of block 712 is required to leave no trace behind of the uninstalled product.

Alternative Uninstallation Verification

Figure 8:
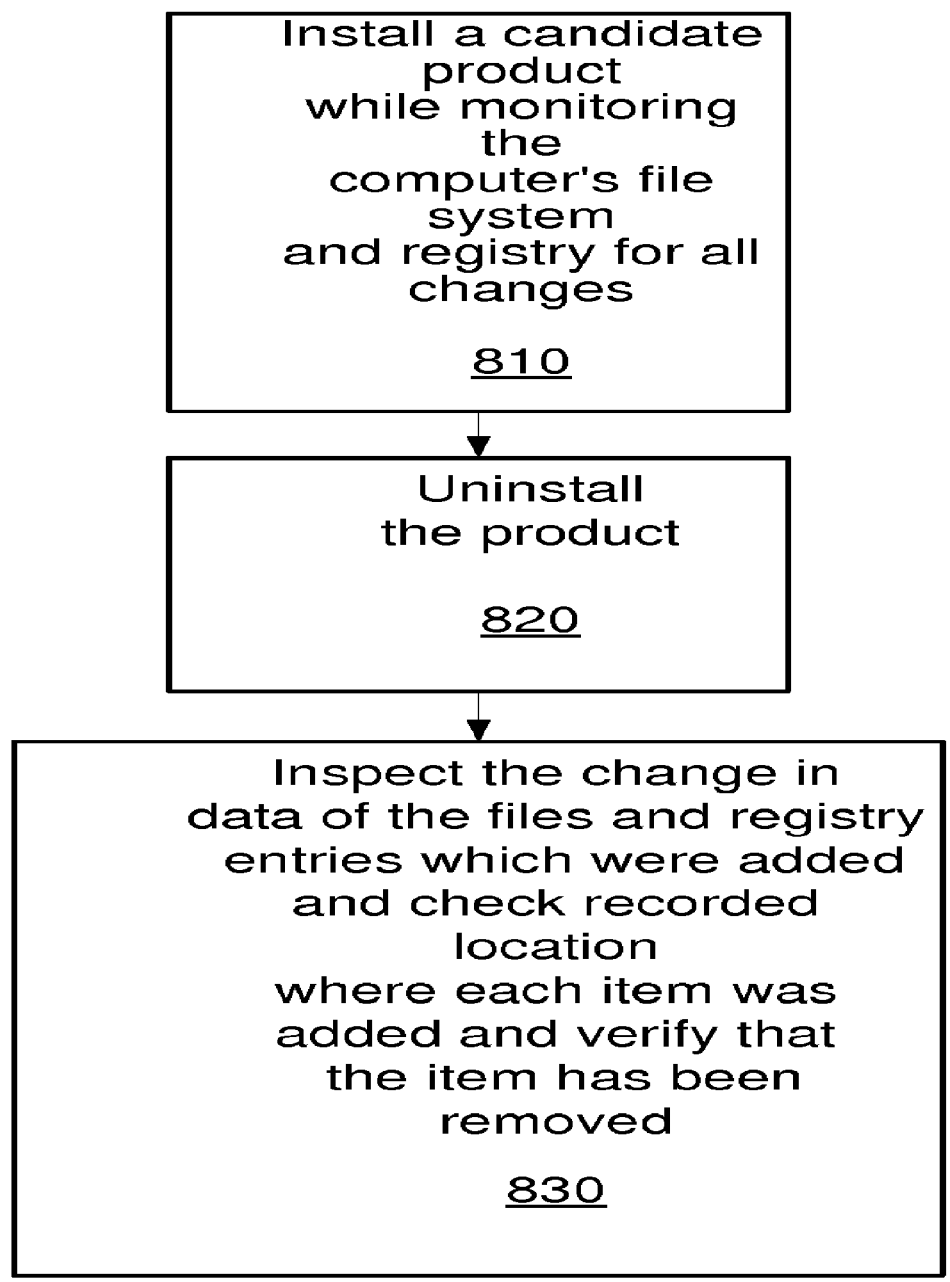
FIG. 8 is a flow diagram illustrating a method in accordance with an embodiment of the present invention.

According to an embodiment, an alternative verification procedure can be performed that verifies that an uninstall removes a prior installed product. Specifically, referring to FIG. 8, block 810 provides for installing a candidate product while monitoring the computer's file system and registry for all changes. When the install has finished, this data comprises the change data of the changes made to the computer.

Block 820 provides for uninstalling the product.

Block 830 provides for inspecting the change in data of the files and registry entries which were added and go to the recorded location where each item was added and verify that the item has been removed. Monitoring the computer to see what files get added, deleted or changed can be performed using Windows APIs such as the FileSystemWatcher class in the .NET Framework. The code can be implemented using the FileSystemWatcher class to monitor file changes to the C:\ drive and its subdirectories. After initializing, the operating system calls the OnChanged, OnCreated, OnDeleted and OnRenamed methods when a file is changed, created, deleted or renamed during the install. The code in these methods records the change by writing it to a file. Note that some changes to the file system during an install are a normal part of the operating system behavior, and there is a list of the changes that are not directly caused by the install package. These changes are filtered out using the SkipFile method which checks to see if this change is an operating system behavior and not a consequence of the install.

Exemplary code could be implemented as follows:

```
public void DoWatch( )
{
FileSystemWatcher watcher = new FileSystemWatcher( );
watcher.Path = @"C:\";
    watcher.IncludeSubdirectories = true;
    /* Watch for changes in LastAccess and LastWrite times, and
    the renaming of files or directories. */
    watcher.NotifyFilter = NotifyFilters.LastWrite |
    NotifyFilters.FileName
                 | NotifyFilters.DirectoryName;
    // Add event handlers.watcher.
    Changed += new FileSystemEventHandler(OnChanged);
    watcher.Created += new FileSystemEventHandler(OnCreated);
    watcher.Deleted += new FileSystemEventHandler(OnDeleted);
    watcher.Renamed += new RenamedEventHandler(OnRenamed);
    watcher.EnableRaisingEvents = true;
}
bool SkipFile (string fullpath)
{
    string filename = Path.GetFileName (fullpath);
    return Ignore.ContainsKey (filename);
}
private void OnChanged(object source, FileSystemEventArgs e)
```

-continued

```
{
    if (SkipFile (e.FullPath))
        return;
    sr.WriteLine ("File: " + e.FullPath + " " + e.ChangeType);
}
private void OnCreated(object source, FileSystemEventArgs e)
{
    // a New file has been created on the computer
    if (SkipFile (e.FullPath))
        return;
    sr.WriteLine('File: " + e.FullPath + " " + e.ChangeType);
}
private void OnDeleted(object source, FileSystemEventArgs e)
{
    // A file was deleted
    if (SkipFile (e.FullPath))
        return;
    sr.WriteLine("File: " + e.FullPath + " " + e.ChangeType);
}
private void OnRenamed(object source, RenamedEventArgs
e)
{
    // A file was renamed.
    if (SkipFile (e.FullPath))
        return;
    sr.WriteLine("File: {0} renamed to {1}", e.OldFullPath,
        e.FullPath);
}
}
```

When the install has finished, there is now a record of changes to the computer made by the install. The product is then uninstalled. This record of changes to the computer is now processed to verify that any changes have been undone. For example, if a file as added to the computer (detected by the OnCreated event above) that file must not be present on the computer after the uninstall has completed.

Types of Protosets

According to an embodiment, the programs and types of files on a protoset can be a function of the creator of the protoset. For example, the data files provided by a software provider entity could include software programs. The provider entity can be a hardware manufacturer that specifies and collects the appropriate master set of data files to be included in a protoset.

In one embodiment, a protoset includes media files determined in accordance with the type of electronic device 300 manufactured and the end user. In one embodiment, the end user can include a targeted segment of customers. In one embodiment, electronic device 300 can include one or more protosets.

In one embodiment, a protoset is created for a consumer-grade, personal computer, and can be configured to include an operating system, application programs, fonts, and Screen-saver files.

In another embodiment, a protoset configuration aimed at a small business user includes several office software suites (e.g., Microsoft™, Corel Wordperfect™, Evermore™, StarOffice™ OpenOffice™ several email programs (e.g., Outlook™, Eudora™, Thunderbird™), several ISP access programs, several Internet browsers, (e.g., Explorer™, Netscape Navigator™, Mozilla Foxfire™, Opera™) several class libraries (e.g., .Net™, Java™) several media players (e.g., Windows Media™, Quicktime™, RealNetworks™), several anti-virus programs (e.g., Norton™ McAfee™, Sophos™), several sets of productivity tools, several tax and accountancy packages (e.g., Intuit™, TurboTax™, Taxcut™) and the like.

A protoset can also be configured for a personal computer manufacturer supplying PCs for a specific enterprise (such as a Citibank™ or a GM™), the protoset could include the operating program, such as Windows™ XP, and all the applications programs, both those commercial available and those developed in house, and data commonly required for all functional areas within that specific enterprise.

In other embodiments, the protoset can be configured for a personal media player such as an iPod™, music files, video files, and audiobook files would predominate. For example, Apple™'s music store iTunes™, at the time of this writing, carries over one million song tracks. Some iPod™ models today store over 15,000 songs. Apple™ could offer many alternative protosets. Apple™ could offer iMix™ playlists done by professional DJ's or iPod™ customers or individual systematic choices by overall popularity (by download frequency or industry ranking) titles or by such factors as genre, era, instrument, language, artist nationality, consumer demographic (e.g., Classical, Big Band, Jazz, Techno, Country Western, Pop, Rap, Goth, Guitar, Movie Sound Tracks, Show Tunes, Bubble Gum, Asian, Baby Boomer etc.) or a customer-appropriate mix of several of these variables. The range of titles in the protoset can be greater than the total storage of the device as long as the selected titles fit within the storage of the model being purchased.

The protoset can also be configured for a directional navigation system device, the segments addressed and the appropriate protosets might be tailored by geography (region, country, continent), by transportation modality (road, air, ship, rail, boat), by consumer, professional, or military usage (pleasure boat, container ship, destroyer, passenger car, interstate 18 wheel truck, tank), and OEM or aftermarket. The most prevalent media files comprising the protosets would be maps with other appropriate geographic information system (GIS) files.

The protoset can also be configured for a home theatre video server, the prevalent media files could be digital movies. For example a manufacturer like Kaleidescape™ could offer a protoset of every movie to have been awarded at least one Academy Award. Alternatively, they could offer film protosets by genre, era, or language or appropriate mix.

A protoset for a cellular telephone (cell phone) might have a selection of ring tones, music files, and games. Referring now to Table 1, below, an exemplary list of the types of software that could be included in a protoset is shown.

TABLE 1

Protoset Software Types

| BUSINESS | Educational Bundle | Racing | PERSONAL PRODUCTIVITY | SYSTEM UTILITIES |
|---|---|---|---|---|
| Application Utilities | Electronic Book | Role Playing | Alcohol | Application |
| Communication | Encyclopedia | Shooter | Astrology | Development System |
| CRM/Sales Tools | Foreign Language | Simulation | Auto/Transportation | Compression |
| Fonts | Geography | Sports Games | Bible/Religion | Data Center Management |
| Forms | Health | Strategy | Buying Guide | |
| General Business | History | IMAGING & GRAPHICS | Career Development | Desktop Organizer |
| General Integrated | Language Arts | 3D Modeling/Rendering | CD-R Utilities | Diagnostic |
| Geographic Info System | Literature | Animation | Collecting | Disk Back-up |
| Human Resources | Math | CAD | Cooking | Disk Utilities |
| Internet | Multi-Subject | Camera Utilities | Gardening/Landscaping | Disk/Tape/File |
| Labels | Music Education | ClipArt | Genealogy | Translation |
| Network | Other Education | Desktop Publishing | Health/Nutrition | Document |
| Non-Suite Bundle | Reading | Drawing/Painting | History/News | Communication |
| Presentation Software | Science | Engineering | Hobbies | Document Generation |
| Programming | Spelling | Graphic Images | Home Bundle | Drivers/Spoolers |
| Project Management | Study Skills | Home Graphics | Home Design | File Utilities |
| Server Suite | Teacher Resource | Home Photo Editing | Home Repair | General System Utilities |
| SOHO | Training | OCR | Integrated | Memory Manager |
| Spreadsheet | Typing | Professional | Legal | Menu |
| Stat/Math | Writing | Graphic/Photo Editing | Lottery | Network Resource |
| Suite Bundle | FINANCE | Text/Image | Medical | Sharing |
| Word Processor | Accounting | Management | Miscellaneous | Performance |
| Word Processor Add-On | Personal Finance | Video Editing | Motion Picture | Measurement |
| EDUCATION | Tax | Web | Movie/TV | Printer Utilities |
| Almanac | GAMES | Development/Publish | Music | Screen Utilities |
| Art | Action | OPERATING SYSTEM | Occult | Security |
| Atlas | Adventure | Commercial Operating | Parenting | System Utilities Suite |
| College Handbook | Arcade | System | Personal Improvement | Virus Detection |
| Computer Science | Children's | Consumer Operating | Pets | Voice Recognition |
| Creativity | Family Entertainment | System | Screen Saver | Y2K Solution |
| Critical Thinking | Fighting | Operating System | Sports | |
| Culture | Other | Enhancements | Travel | |
| Dictionary/Thesaurus | Games/Compilations | | Wedding | |

Distribution of Protoset

After creating the protest, distribution of the protoset can be accomplished via a central distribution point. More particularly according to an embodiment, a manufacturer with a protoset can receive a customer order for either a hard drive or a computer system with identified software per a customer order. Next, the customer order can be converted into a bill of materials. A bill of materials can include both software and hardware requiring kitting, and creating of a metaset.

In one embodiment, distribution can involve Enterprise Resource Planning (ERP) wherein a supply chain management system applies. For purposes of this disclosure, ERP includes a business management system that integrates different facets of a business, including planning, manufacturing, sales, and marketing. ERP methodologies can include business activities such as inventory control, order tracking, customer service, and finance.

For example, a supply chain management (SCM) software implementation can include having a manufacturer receive an order for hardware, software or a combination of hardware and software. The manufacturer can produce a protoset for installation in a computer system via a hard drive or over a network. The manufacturer can then either produce a metaset or enable another party to alter the protoset into a metaset at another location. In one embodiment, the protoset is provided with or without hardware to another party. The protoset can include data, a metadata file to enable the subtraction function to operate, and APIs to enable the subtraction function.

Figure 9:
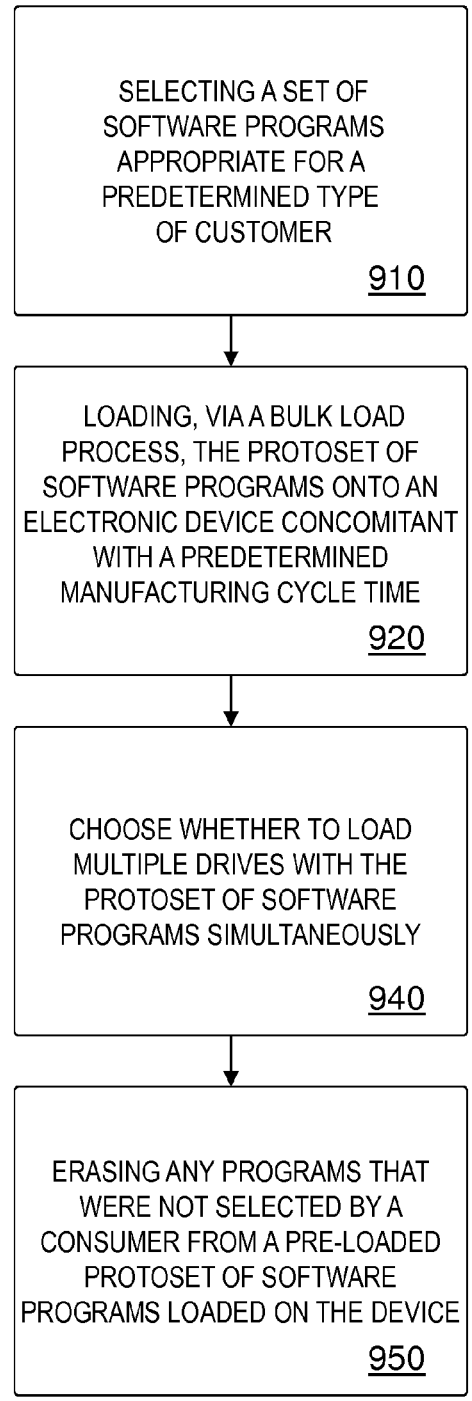
FIG. 9 is a flow diagram illustrating a method in accordance with an embodiment of the present invention.

Referring now to FIG. 9, a flow diagram illustrates a method for acquisition, at a transaction time by a consumer of a vendor-provided electronic device with operable customer-selected software.

Block 910 provides for a vendor selecting a set of software programs appropriate for a predetermined type of customer. Block 920 provides for loading via a bulk load process the protoset of software programs onto an electronic device concomitant with a predetermined manufacturing cycle time. The predetermined manufacturing cycle time could be a time and point in the manufacturing cycle convenient and cost-effective for either a manufacturer, vendor or the like.

In one embodiment, the loading is performed after a consumer purchases an electronic device including specifying at least one program from a set of software programs made available to the consumer.

Block 940 provides for a manufacturer to choose whether to load multiple drives with the protoset of software programs simultaneously. In addition, the program loading can be done one at a time and point in the manufacturing cycle when it is most convenient and cost-effective for the vendor rather than at a point-of-sale transaction, as determined according to manufacturing and system requirements.

Block 950 provides for the vendor erasing any programs that were not selected by a consumer from a pre-loaded protoset of software programs loaded on the device. The method described in FIG. 9 beneficially avoids time-consuming loading of individual programs by first loading via a bulk transfer of a bit image a protoset of software programs.

Figure 10:
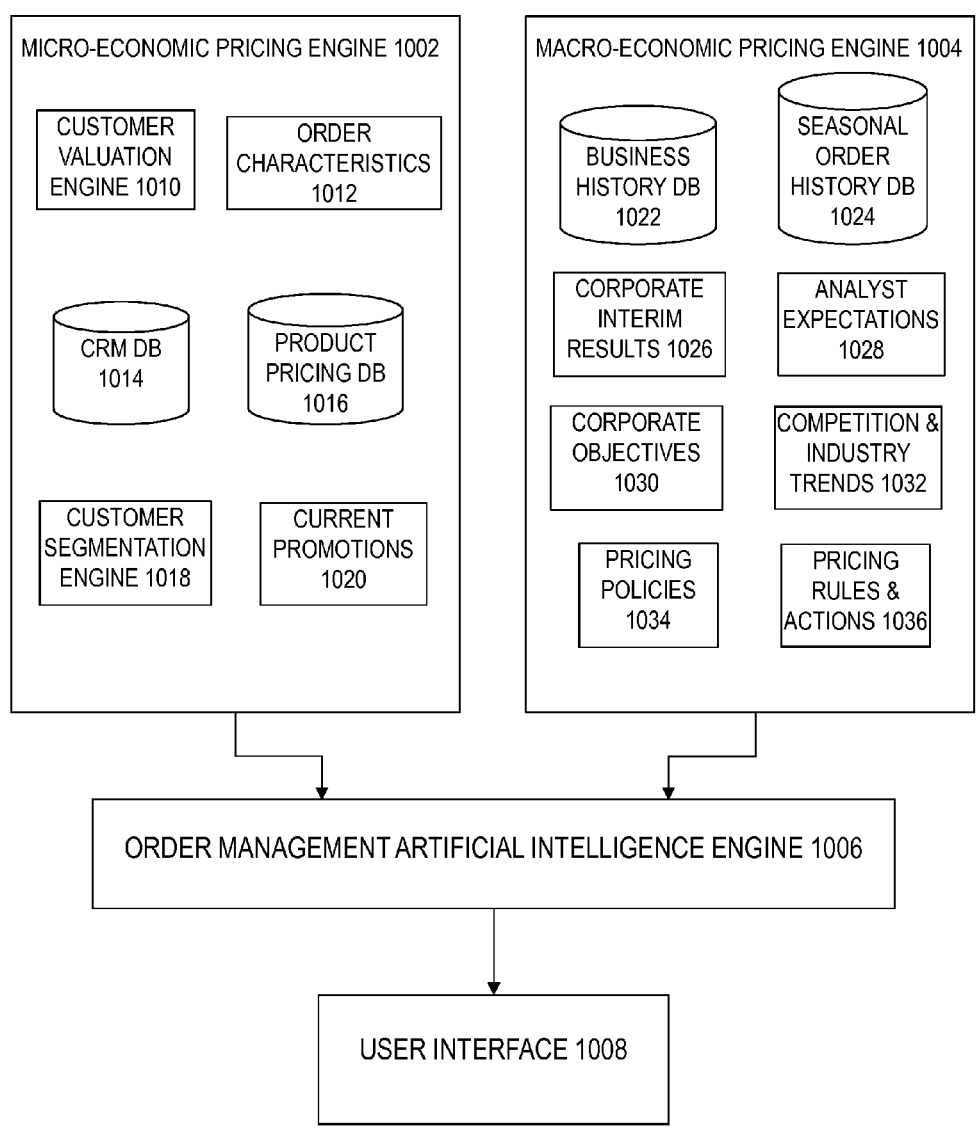
FIG. 10 is a block diagram of a pricing engine for determining a price of selected digital assets of the panoplex.

FIG. 10 shows a pricing engine 1000 to implement complex pricing for content of a panoplex. Pricing engine 1000 includes a micro-economic pricing engine 1002 and a macro-economic pricing engine 1004, each of which provides pricing information to an order management artificial intelligence engine 1006, which in turn provides pricing information to user interface 1008.

Micro-economic pricing engine 1002 processes information specific to the user making the selection and to the particular selection being made. Customer valuation engine 1010 determines a particular value of the user as a customer based on such criteria as past ordering history and positive future ordering history. Order characteristics 1012 include such information as the size of the current order (e.g., number of customized computers, value of customized computers—high end vs. bargain machines, etc.). Customer relations management database 1014 contains the customer history data used by customer valuation engine 1010 in determining the value of the user as a customer. Product pricing database 1016 includes pricing information specific to the content of the panoplex and includes pricing policies. Customer segmentation engine 1018 determines a value of the user as a customer from information other than the user's history as a customer—e.g., using the customer's address information to determine a level of affluence, determining from address information that the user is a business customer or is a private individual customer, etc. Current promotions 1020 represents current, short term pricing policies and can be used to periodically fine-tune overall pricing policies.

Macro-economic pricing engine 1004 processes information independent of the particular order to influence pricing on a larger scale, e.g., for all sales from a given entity, referred to herein as the seller. Business history database 1022 includes information of various economic metrics of the seller and/or of the industry in which the seller participates. Seasonal order history database 1024 represents buying patterns over time—identifying patterns specific to holidays, the start of the school year, beginning/ending of fiscal quarters, and simply seasons such as winter, spring, summer, and autumn. Corporate interim results 1026 include a recent history of economic performance of the seller. Analyst expectations 1028 include information regarding what economic experts expect from the seller and suggest consequent effects in the value of the seller based on success or failure in meeting those expectations. Corporate objectives 1030 represent large-scale economic objectives of the seller and may very closely correlate to, or differ significantly from, analyst expectations 1028. Competition and industry trends 1032 represents tendencies of competitors and the industry generally—e.g., to promote growth at the expense of profit or to promote profit at the expense of growth, and the degree to which to promote one over the other. Pricing policies 1034 and pricing rules and actions 1036 allow for manually crafted adjustments in macro-economic pricing engine 1004.

Order management artificial intelligence engine 1006 combines the information, targets, and adjustments of micro-economic pricing engine 1002 and macro-economic pricing engine 1004 to provide an actual price to user interface 1008 for display to the user in response to a change in the current selection. For efficiency, all criteria independent of the particular details of the order being placed by the user are evaluated and processed once to form baseline pricing properties, such as a base price and/or minimum acceptable margin. Thus, in response to any change in the selection being made by the user, only a fairly modest evaluation of the pricing policies of the specifically selected content is required. The price represented to the user can be updated and redisplayed relatively quickly, giving the impression of immediate response by the user interface.

Due to the abundant choice expected to be offered to the user, the user interface provides the ability to save a current selection and to re-load the saved current selection at a later time. This provides the user with the opportunity to carefully evaluate and research various options of the selection.

The buyer of a device is given a choice of media to be operationally available, installed on the device at delivery. Individual software is selected from a given universe (protoset) or several given protosets by a prospective buyer. The offering protoset will vary by type, capabilities, and capacities of the carrier device and the business objectives of the device manufacture.

The selection process may vary according to the type of device or the functional class of buyer. In one embodiment, a buyer of software or a combination of software and hardware can indicate choices of software from a list of software in a protoset. In other embodiments, a user can receive preselected software choices or choices determined by another entity other than a protoset manufacturer. In one embodiment, a protoset list of programs is presented via a remotely-hosted selection program accessed via network or web interface. This program could be implemented as part of a device purchase program.

Alternatively, a selection program can be run on a computer being purchased locally, as at an electronics and computer products retailer or at the home or place of business of the purchaser. A selection program can be configured according to the environment required. For example, in a home use environment, additional modules can be included to provide security and access mechanisms to assure purchase, payment, and program erasure completion.

In some embodiments, the present invention provides a first article of manufacture that includes: two or more installed, functional software applications organized in a protoset, the protoset configured to enable creation of one or more metasets, each of the one or more metasets configured to be operable with a computer system; and a protoset module configured to operate on the protoset to enable creation of the one or more metasets, the protoset module responsive to requests for the creation of the metasets.

In some embodiments of the first article of manufacture, the protoset module is further configured to provide screening via the creating of the metasets, the screening to remove one or more instability sources.

In some embodiments of the first article of manufacture, the protoset module is further configured to remove one or more of viruses, adware programs, and worm programs.

Some embodiments of the first article of manufacture further comprise a pricing module coupled to the protoset module, the pricing module configured to determine a price for the metaset by determining a price based on one or more corporate objectives. In some embodiments of the first article of manufacture with the pricing module, the corporate objectives include one or more profit goals and/or pricing limitations. In some embodiments of the first article of manufacture with the pricing module, the corporate objectives can be altered at near real time. In some embodiments of the first article of manufacture with the pricing module, the pricing module is configured to enable on-the-fly bundling of the functional software applications independent of separate media, boxed sets, or network delivery, the on-the-fly bundling including on-the-fly pricing based on the one or more corporate objectives. In some embodiments of the first article of manufacture with the pricing module, the pricing module performs dynamic pricing via determining a pricing goal for each created metaset, the pricing goal determined by one or more of a software provider, an enterprise entity, a supply chain entity and a software retailer. In some embodiments of the first article of manufacture with the pricing module, the pricing module dynamically determines a price for the functions software applications and one or more components of an electronic device operable with the functional software applications, the pricing module configured to correlate pricing of the one or more components with the functional software applications. In some such embodiments, the pricing module correlates the pricing of the one or more components and the functional software applications with the one or more corporate objectives. In some such embodiments, the pricing module is coupled to a graphical user interface that allows a menu selection for an end user, the menu selection configured to display one or more of a pseudo-fixed price and a dynamic price. In some such embodiments, the pricing module enables profit optimization based on a function of market price determinants and company objectives.

In many ways, the content of a panoplex is a time-limited resource like seats on an airline flight or rooms in a hotel; if the computer ships with content not selected by the user, the seller of the computer has failed to capture revenue from the non-selected content. Accordingly, many of the yield management pricing approaches used by airlines and the hospitality industry are applicable to content of a panoplex. In addition to the temporal sensitivity of the content, the content of a panoplex has low variable costs, is a resellable inventory, and has fluctuating demand with known historical data (sales fluctuate with the start of the school year, holidays, release of new operating systems or a new class of high-speed processors).

Pricing: Policy-Based Opportunities for Yield Management

Creating a device as a software distribution channel opens a new opportunity for policy-based pricing. Policies might be framed at the micro level, reflecting the market cost of the software and the value of the purchaser. Alternatively, policies might reflect tactical or strategic corporate objectives. The pricing module may continuously interact with the selection program or might be partially or entirely subsequent to selection.

In some embodiments, the present invention provides a policy-driven computerized means to sell software combining different modes of prices including:

Past History;
Competitive Pressure or, pricing;
Seasonal—back to school;
Customer value;
Yield Management (# of PCs, ASP, running margins, publisher volume commitments);
Fixed;
Random;
End of Life discount;
New Service;
New Customer;
Total Sale:
Total Customer (or enterprise) Lifetime Value;
Variable Discount (bundling) specified or offered;
Haggling (reciprocal offers with floor);
Limited Free;
Manufacturer Incentive Driven;
Cross Selling;
Competitive Knock Out (ask for x, offered y for 40% off);
Coupon/Promotion;
Limited Time Only;
Customer Classification.

In some embodiments of the first article of manufacture, the protoset module is disposed on the first article of manufacture.

Some embodiments of the first article of manufacture further include an interface for interacting with the protoset module when the protoset module is not disposed on the first article of manufacture.

In some embodiments of the first article of manufacture, the first article of manufacture is disposed in a computer system, the protoset module being made available by said computer system.

In some embodiments of the first article of manufacture, the protoset is created to enable a module is configured to perform a cleansing operation to remove excess data from the protoset.

In some embodiments, the present invention provides a first method for installing software on a computer system, the first method including: reading a plurality of component descriptors from a computer readable file, at least one of the component descriptors describing two or more installed, functional software applications organized in a protoset; and performing a reduction operation on the protoset to remove one or more of the two or more installed, functional software applications based on the plurality of component descriptors the performing a reduction operation producing a metaset of functional software applications associated with the plurality of component descriptors.

In some embodiments of the first method, the protoset is created via an installer facility using install routines supplied by one or more vendors of the functional software applications.

In some embodiments of the first method, the protoset is subjected to a cleaning operation to remove one or more data components that are unnecessary and present due to an installation operation.

In some embodiments of the first method, the protoset is stored as one or more of a single bit-image in a network environment, a collection of data files on a hard drive, and/or a collection of data files on non-volatile erasable memory.

In some embodiments of the first method, the two or more functional software applications are configured to follow a component object model to ensure compatibility and version resource data.

In some embodiments of the first method, the two or more functional software applications are compartmentalized into separate individual or groups of functional software applications.

In some embodiments of the first method, the two or more functional software applications are compartmentalized and disposed in a partitioned hard drive, the partitioned hard drive enabling separating of an operating system from one or more of the two or more functional software applications.

In some embodiments of the first method, comprising: performing an addition operation to add data to one of the protoset and/or the metaset.

In some embodiments of the first method, the performing a reduction operation includes comparing a list of the two or more functional software applications in the protoset with the plurality of component descriptors to determine the metaset.

In some embodiments of the first method, the plurality of component descriptors are received as a request to create a metaset, the request received by a server via an application programming interface (API), the API configured to transmit the request over a network connection.

In some embodiments, the present invention provides a second method for installing data on an electronic device, the second method comprising: reading a plurality of component descriptors from a computer readable file, at least one of the component descriptors describing two or more installed, functional data files organized in a protoset; performing a reduction operation on the protoset to remove one or more of the two or more installed, functional data files, the reduction operation; loading a reference component configured to reference one or more of the software programs; loading an information component configured to enable installation and removal of the data files; loading an executable file configured to enable altering the proto set of data, the executable file configured to generate an altered set of software programs via a removal of one or more software programs from the protoset of software programs; and encapsulating a metadata file to enable the altering the protoset of software programs, the encapsulating creating the protoset of data.

In some embodiments, the present invention provides a second article of manufacture that includes: an electronic device operable with installed data components, the installed data components including data components requiring an installation procedure including computationally more computer time than an erasure procedure to remove the installed data components, at least one of the installed data components preinstalled with one or more data components from a protoset of installed data components, the protoset responsive to an indication to erase at least one of the data components in the protoset.

In some embodiments of the second article of manufacture, the electronic device is one of a desktop personal computer, laptop computer, server, enterprise computer, personal media player, audio player, audio jukebox, video server, digital printer, fax machine, cable TV interface box, personal video recorder, camcorder, cell phone, watch, flat panel television, digital picture frames, personal digital assistants, digital game machines, electronic book readers, directional navigation systems, toys, digital-enabled appliances and machinery, and/or "smart" devices.

In some embodiments, the present invention provides a computer-implemented third method for acquisition of a computer apparatus, the third method comprising: receiving from an end user a designation of one or more computer apparatus components for the computer apparatus and a designation of a plurality of data files including one or more of software applications and media files; and erasing from a pre-constructed storage device configured with a protoset of functional data files any data files not included in the designation of the plurality of data files received from the end user.

In some embodiments of the computer-implemented third method, the protoset is provided by a supplier to a vendor of the computer apparatus. In some such embodiments of the third method, the supplier is one or more of a hard drive manufacturer and a supplier of bulk, non-volatile, erasable memory.

In some embodiments of the computer-implemented third method, the receiving from an end user a designation of one or more computer apparatus components for the computer apparatus and a designation of a plurality of data files occurs within a time period during which the computer apparatus is fabricated according to the designation of the one or more computer apparatus components.

In some embodiments of the computer-implemented third method, the receiving from an end user a designation of one or more computer apparatus components for the computer apparatus and a designation of a plurality of data files occurs contemporaneously with the erasing from the pre-constructed storage device.

In some embodiments of the computer-implemented third method, the receiving from an end user a designation of one or more computer apparatus components for the computer apparatus and a designation of a plurality of data files includes: connecting by the end user with an entity performing the erasing, the entity performing the erasing including one or more of a sales outlet, a retail store, a value-added reseller, and/or a system integrator.

In some embodiments of the computer-implemented third method, the computer apparatus is member of the group consisting of desktop personal computers, laptop computers, servers, enterprise computers, personal media players, audio players, audio jukeboxes, video servers, digital printers, fax machines, cable TV interface boxes, personal video recorders, camcorders, cell phones, flat panel televisions, digital picture frames, personal digital assistants, digital game machines, electronic book readers, directional navigation systems, toys, digital-enabled appliances and machinery, and/or "smart" devices.

In some embodiments, the present invention provides a computer program product that includes: a signal bearing medium bearing one or more instructions for reading a plurality of component descriptors from a computer readable file, at least one of the component descriptors describing two or more installed, functional software applications organized in a protoset; and one or more instructions for performing a reduction operation on the protoset to remove one or more of the two or more installed, functional software applications based on the plurality of component descriptors, the one or more instructions for performing a reduction operation producing a metaset of functional software applications associated with the plurality of component descriptors.

In some embodiments of the computer program product, the protoset is created via an installer facility using install routines supplied by one or more vendors of the functional software applications.

In some embodiments of the computer program product, the protoset is subjected to a cleansing operation to remove one or more data components that are unnecessary and present due to an installation operation.

In some embodiments of the computer program product, the protoset is stored as one or more of a single bit-image in a network environment, a collection of data files on a hard drive, and/or a collection of data files on non-volatile erasable memory.

In some embodiments of the computer program product, the two or more functional software applications are configured to follow a component object model to ensure compatibility and version resource data.

In some embodiments of the computer program product, the two or more functional software applications are compartmentalized into separate individual or groups of functional software applications.

In some embodiments of the computer program product, the two or more functional software applications are compartmentalized and disposed in a partitioned hard drive, the partitioned hard drive enabling separating of an operating system from one or more of the two or more functional software applications.

In some embodiments, the present invention provides a computer system that includes: a processor; a memory coupled to the processor, the memory including a module configured to create a reference component configured to reference one or more software programs to be included in a protoset of data files, an information component configured to enable installation and removal of the one or more software programs, and an executable file configured to enable altering the state of the one or more software programs, the executable file configured to generate a requested metaset of software programs via an alteration of one or more of the one or more software programs.

In some embodiments of the computer system, the module is configured to access the one or more software programs to be included in the protoset of data via a software retrieval application programming interface (API).

In some embodiments of the computer system, the module is configured to enable distribution of the protoset of data via a network connection. In some such embodiments of the computer system, the API is configured to respond in near real-time. In some embodiments of the computer system, the API is configured to interact with a pricing module to determine.

In some embodiments, the present invention provides a third article of manufacture that includes: a protoset of software programs capable of being stored as an image on a network, the protoset including: a reference component configured to reference one or more of the software programs; a information component configured to enable installation and removal of the software; and an executable file configured to enable altering the protoset of software programs, the executable file configured to generate a requested set of software programs via a removal of one or more software programs from the protoset of software programs.

In some embodiments of the third article of manufacture, the removal is performed via a comparison to a list of the software programs in the protoset with a list of the requested set of software programs.

In some embodiments of the third article of manufacture, the requested set of software programs meets an authorization requirement.

In some embodiments of the third article of manufacture, the executable file is configured to determine a list of the software programs to be removed, the executable file configured to generate a look up key to one or more removal executable files, the executable file configured to generate a master executable uninstall file. In some such embodiments of the third article of manufacture, the one or more removal executable files are located in a database.

In some embodiments, the present invention provides a system for enabling data deployment, the system for enabling data deployment including: means for receiving from an end user a designation of one or more computer apparatus components for a computer apparatus and a designation of a plurality of data files including one or more of software applications and media files; and means for erasing from a pre-constructed storage device configured with a protoset of functional data files any data files not included in the designation of the plurality of data files received from the end user.

In some embodiments of the system for enabling data deployment, the proto set is provided by a hard drive manufacturer and/or a supplier of bulk, nonvolatile, erasable memory to a vendor of the computer apparatus.

In some embodiments of the system for enabling data deployment, the means for receiving from an end user a designation of one or more computer apparatus components for the computer apparatus and a designation of a plurality of data files requires a time period during which the computer apparatus is fabricated according to the designation of the one or more computer apparatus components.

In some embodiments of the system for enabling data deployment, the means for receiving from an end user a designation of one or more computer apparatus components for the computer apparatus and a designation of a plurality of data files requires contemporaneous action with the means for erasing from the pre-constructed storage device.

In some embodiments of the system for enabling data deployment, the means for receiving from an end user a designation of one or more computer apparatus components for the computer apparatus and a designation of a plurality of data files includes: means for connecting by the end user with an entity performing the erasing, the entity performing the erasing including one or more of a sales outlet, a retail store, a value-added reseller, and/or a system integrator.

In some embodiments of the system for enabling data deployment, the computer apparatus encompasses one or more devices selected from the group consisting of: desktop personal computers, laptop computers, servers, minicomputers, enterprise computers, supercomputers, personal media players, audio players, audio jukeboxes, video servers, digital printers, fax machines, cable TV interface boxes, personal video recorders, camcorders, mobile phones, watches, flat panel televisions, digital picture frames, personal digital assistants, game consoles, electronic book readers, vehicle guidance and navigation systems, electronically augmented toys, digitally-enabled appliances, machinery, test and analytical instruments, and other "smart" devices.

While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified steps performed in the same or a different order.

What is claimed is:

1. A system for digital-asset delivery comprising:
   a storage medium;
   a processor operatively coupled to the storage medium;
   a plurality of digital assets organized in a protoset on the storage medium, the protoset configured to enable creation of a first metaset on the storage medium, the first metaset configured to be operable with an electronic device that includes the storage medium, wherein the first metaset includes a selected set of the plurality of digital assets, wherein the plurality of digital assets are unavailable unless and until a protoset module is executed by the processor, and wherein the plurality of digital assets undergoes a validation process during creation of the protoset in order to eliminate conflicts among the plurality of digital assets;
   the protoset module configured to be executed by the processor, wherein the protoset module, when executed by the processor:
      distinguishes the selected set of the plurality of digital assets from a non-selected set of the plurality of digital assets, and
      operates on the protoset to create the first metaset in a state in which each of the digital assets in the first metaset is operationally available.

2. The system of claim 1, wherein the protoset module, when executed by the processor, is further configured to clean a registry associated with the protoset such that unnecessary registry entries are removed and registry coherence is confirmed.

3. The system of claim 1, wherein the protoset module, when executed by the processor, is further configured to instantiate a defragmentation program on the storage medium.

4. The system of claim 1, further comprising:
   a pricing module coupled to the protoset module, wherein the pricing module is configured to dynamically price the first metaset.

5. The system of claim 4, wherein the pricing module is configured to dynamically price the first metaset based at least in part on processed micro-economic information.

6. The system of claim 4, wherein the pricing module is further configured to dynamically price the first metaset via a yield-management program.

7. The system of claim 1, wherein the protoset module, when executed by the processor, further operates on the protoset to remove a plurality of the non-selected set of the plurality of digital assets.

8. A method for loading digital assets on an electronic device, the method comprising:
   building, using a computer system, a protoset on a storage medium of the electronic device, wherein the protoset includes a plurality of digital assets, wherein the plurality of digital assets are unavailable unless and until the computer system modifies the protoset, wherein the building of the protoset includes validating the protoset in order to eliminate conflicts among the plurality of digital assets;
   receiving, into the computer system, selection information, wherein the selection information indicates a selected set of the plurality of digital assets; and
   modifying, by the computer system, the protoset to produce a first metaset of operationally available digital assets, wherein the first metaset includes the selected set of the plurality of digital assets based on the received selection information.

9. The method of claim 8, further comprising dynamically pricing the first metaset.

10. The method of claim 9, wherein the dynamically pricing of the first metaset includes implementing a yield-management program.

11. The method of claim 9, wherein the dynamically pricing of the first metaset includes processing micro-economic information.

12. The method of claim 9, wherein the dynamically pricing of the first metaset includes processing macro-economic information.

13. The method of claim 8, wherein the modifying further includes removing a plurality of a non-selected set of the plurality of digital assets based on the received selection information.

14. The method of claim 8, further comprising:
   instantiating a defragmentation program on the storage medium.

15. A non-transitory computer-readable storage medium having instructions stored thereon for causing a suitably programmed computer to execute a method comprising:
   building, using the computer, a protoset on a storage medium of an electronic device, wherein the protoset includes a plurality of digital assets, wherein the plurality of digital assets are unavailable unless and until the computer modifies the protoset, wherein the building of the protoset includes validating the protoset in order to eliminate conflicts among the plurality of digital assets;
   receiving, into the computer, selection information, wherein the selection information indicates a selected set of the plurality of digital assets; and
   modifying, by the computer, the protoset to produce a first metaset of operationally available digital assets, wherein the first metaset includes the selected set of the plurality of digital assets based on the received selection information.

16. The computer-readable storage medium of claim 15, further comprising instructions such that the method further comprises dynamically pricing the first metaset.

17. The computer-readable storage medium of claim 16, further comprising instructions such that the dynamically pricing of the first metaset includes implementing a yield-management program.

18. The computer-readable storage medium of claim 16, further comprising instructions such that the dynamically pricing of the first metaset includes processing micro-economic information.

19. The computer-readable storage medium of claim 16, further comprising instructions such that the dynamically pricing of the first metaset includes processing macro-economic information.

20. The computer-readable storage medium of claim 15, further comprising instructions such that the method further comprises cleaning a registry associated with the protoset such that unnecessary registry entries are removed and registry coherence is confirmed.

* * * * *